(12) United States Patent
Chase et al.

(10) Patent No.: US 12,315,370 B2
(45) Date of Patent: *May 27, 2025

(54) ROADWAY GUIDANCE SYSTEM

(71) Applicants: Arnold Chase, West Hartford, CT (US); William Chase, Avon, CT (US)

(72) Inventors: Arnold Chase, West Hartford, CT (US); William Chase, Avon, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/605,953

(22) Filed: Mar. 15, 2024

(65) Prior Publication Data

US 2024/0249621 A1    Jul. 25, 2024

Related U.S. Application Data

(63) Continuation of application No. 15/986,472, filed on May 22, 2018, now Pat. No. 11,935,405.

(Continued)

(51) Int. Cl.
| | |
|---|---|
| G08G 1/0967 | (2006.01) |
| G05D 1/00 | (2024.01) |
| G05D 1/227 | (2024.01) |
| G05D 1/243 | (2024.01) |
| G05D 1/247 | (2024.01) |
| G08G 1/0962 | (2006.01) |
| G08G 1/16 | (2006.01) |
| H01Q 1/32 | (2006.01) |

(Continued)

(52) U.S. Cl.
CPC ..... *G08G 1/096783* (2013.01); *G05D 1/0088* (2013.01); *G05D 1/0259* (2013.01); *G05D 1/028* (2013.01); *G05D 1/227* (2024.01); *G05D 1/243* (2024.01); *G05D 1/247* (2024.01); *G08G 1/09623* (2013.01); *G08G 1/096716* (2013.01); *G08G 1/096725* (2013.01); *G08G 1/096758* (2013.01); *G08G 1/165* (2013.01); *G08G 1/166* (2013.01); *G08G 1/167* (2013.01); *H01Q 1/3225* (2013.01); *H01Q 13/22* (2013.01); *H01Q 21/28* (2013.01); *H01Q 1/3275* (2013.01)

(58) Field of Classification Search
None
See application file for complete search history.

(56) References Cited

U.S. PATENT DOCUMENTS

| | | | | |
|---|---|---|---|---|
| 4,361,202 A | * | 11/1982 | Minovitch | G05D 1/0265 |
| | | | | 246/167 D |
| 2018/0101705 A1 | * | 4/2018 | Martinez | G06K 7/10356 |

* cited by examiner

*Primary Examiner* — Aniss Chad
*Assistant Examiner* — Madison R. Inserra
(74) *Attorney, Agent, or Firm* — McCormick, Paulding & Huber PLLC

(57) ABSTRACT

An Improved Roadway Guidance System provides guidance elements in a roadway as means to guide a vehicle along the roadway, as well as supply important information to the vehicle to enhance the autonomous operation of the vehicle in a safe and efficient manner. The system comprises at least three parts: (1) the use of overlaid roadway "emitter strips" that provide an extended excitation/emission field simultaneous with direct guidance instructions to passing vehicles; (2) the use of a linearly-arranged antenna array system provided on the vehicle and adapted for interaction with the emitter strips for positionally locating the vehicle within a travel lane and providing additional informative data for operation of the vehicle; and (3) the use of a multi-port Receiver Unit that works with the antenna array and the host vehicle's guidance system to optimize autonomous operation of the vehicle.

35 Claims, 9 Drawing Sheets

Related U.S. Application Data

(60) Provisional application No. 62/509,324, filed on May 22, 2017.

(51) Int. Cl.
*H01Q 13/22* (2006.01)
*H01Q 21/28* (2006.01)

ROADWAY GUIDANCE SYSTEM

CROSS-REFERENCE TO RELATED APPLICATIONS

This application is a continuation of U.S. patent application Ser. No. 15/986,472, filed May 22, 2018, which claims the benefit under 35 U.S.C. § 119(e) of U.S. Provisional Application No. 62/509,324, filed May 22, 2017, each of which is incorporated herein by reference in its entirety.

TECHNICAL FIELD OF THE INVENTION

The present disclosure generally relates to augmenting the operation of autonomous vehicles and non-autonomous vehicles, and more particularly relates to an Improved Roadway Guidance System for assisting in the safe and efficient operation of autonomous vehicles and non-autonomous vehicles on public or non-public roadways.

BACKGROUND OF THE INVENTION

Many companies are developing autonomous vehicles for commercial and personal use on existing roadways for a variety of applications, including but not limited to personal taxi services, delivery services, or the like. In accordance with the present invention, an autonomous vehicle is a vehicle capable of operating without a human driver. Such vehicles can be designed to operate utilizing an onboard computer and a system of sensors designed to operate the vehicle in the same manner as if there were a human operator. It is envisioned that networks of autonomous vehicles will soon be available, similar to a network of taxis, buses or delivery vans, whereby a user can request an autonomous vehicle to pick-up, transport and drop off passengers, or pick-up, transport, and deliver packages, or the like. Alternatively, users can own an autonomous vehicle for personal use, and use it for ordinary tasks, such as commuting to work, running errands, dropping kids off at school, for travel, or the like.

Current autonomous vehicles in development and testing stage generally utilize multiple systems to operate the vehicle without a human driver. First, a standard Global Positioning System (GPS) is used to plan a route for the vehicle. Taking into account the starting point and the destination for a trip, the GPS determines the best path. However, autonomous vehicles also need a system to recognize dynamic conditions along the path during operation of the vehicle. Such a system may be referred to as an augmented GPS, which can utilize an array of technologies, such as cameras, sensors, radar, lidar and lasers to provide a three-dimensional view around the vehicle during operation. Such a system can keep track of other cars around the vehicle, detect obstacles or hazards around the car or in the road up ahead, and determine the location of the edge of the road, upcoming turns, hills or descents, and assess general road conditions ahead, behind and around the vehicle. Autonomous vehicles also require a centralized system within the car to process the information provided from the GPS and augmented GPS, and various additional sensors, and utilize the processed information to autonomously operate the vehicle. Such a system commonly comprises a Computer Area Network (CAN) Bus.

Non-autonomous vehicles—i.e., vehicles operated by a human driver—also may utilize similar technology to back-up the human driver. For example, cars have used various forms of cruise control for decades. More recently, cars have been equipped with systems that will autonomously parallel park the car. Many modern cars are now equipped with systems that assist the driver when the car begins to drift out of its lane on the highway, or brake the car if it is getting too close to the car in front of it, or alert the driver if there is an object in the road ahead.

While much work has been done to develop visual, lidar, radar, and other technologies to allow vehicles, be they autonomous or quasi-autonomous, the capability to more reliably handle required navigation tasks, these efforts have been frustrated by limitations in the existing technologies used to operate autonomous vehicles, including the inability of the prior art approaches to reliably function during periods of inclement weather, such as rain, frozen precipitation, snow, fog, and the like, or in view of reflections from bright sunlight, improperly lit sections of roadway, or where objects such as piles of leaves or snow drifts physically cover or mask traditional roadway markings, the edge of the road, or wear, damage or obstacles in the roadway itself, let alone overcoming the inevitable fading and deterioration of painted roadway markings or other identifiers typically utilized by cameras, lasers, radar, lidar and the like to process dynamic conditions of the road. Additionally, the cameras and sensors on an autonomous vehicle could occasionally be covered or blocked, such as by dirt, snow, or smoke, or may be malfunctioning through ordinary wear or accident, thereby requiring a back-up system to ensure safe and efficient operation of the vehicle. Just as human drivers, when confronted with snow-covered roadways, need to rely on alternative methods of guidance to insure that they are driving on the road by using, for instance, the tire tracks from the travel of previous vehicles, the Improved Roadway Guidance System (IRGS) in accordance with the present invention is designed to be a source of supplemental roadway guidance for primarily autonomous vehicles, but also of benefit to human-driven vehicles as well.

Accordingly, there is a need for a system for aiding the operation of an autonomous vehicle, or even a quasi-autonomous vehicle, utilizing the conditions of the roadway and other factors affecting operation of such vehicles in a safe and efficient manner, while avoiding the drawbacks of prior art guidance systems.

SUMMARY OF THE INVENTION

An Improved Roadway Guidance System (IRGS), in accordance with the present invention, provides guidance elements in or adjacent to the roadway as means to guide a vehicle along the roadway, as well as supply important information to the vehicle to enhance the autonomous operation of the vehicle in a safe and efficient manner. The IRGS of the present invention differs from prior art roadway guidance approaches pertaining to onboard sensor technology and roadway guidance elements in physical embodiment, physical placement, the type and method of excitation, and the emission of a purposeful and specifically modulated data stream (beyond a simple localization emanation) that ultimately provides implicit or explicit command information to an autonomous vehicle.

In accordance with preferred embodiments of the IRGS of the present invention, the system comprises at least three novel parts:

(1) the use of overlaid roadway elements (hereinafter referred to as "emitter strips") that are externally excited/wirelessly powered that provide, in a novel fashion, an extended radio frequency emission field that simultaneously provides direct guidance assistance, instructions and information to nearby Autonomous Vehicles or non-autonomous vehicles;

(2) the use of a linearly-arranged multiple directional antenna array system provided on the vehicle and adapted for interaction with the emitter strips for positionally locating the vehicle within a roadway or a travel lane and providing additional informative data for operation of the vehicle; and (3) the use of a multi-port receiver/data decoder interface unit (Receiver Unit) that works with the antenna array and the host vehicle's guidance system to optimize autonomous operation of the vehicle.

According to embodiments of the present disclosure, a roadway guidance system includes a plurality of emitter strips, each emitter strip being configured to emit a wireless signal, wherein the plurality of emitter strips are configured to be disposed along a roadway in spaced intervals in a direction of travel—for example, along a centerline and/or the left and right edges of a travel lane of the roadway.

In an aspect of the present invention, the wireless signal transmitted for each emitter strip includes (i) location data identifying the placement location of the emitter strip on the roadway; and (ii) informative data providing information relating to the roadway where the emitter strip is located. For example, the location data transmitted by each emitter strip may correlate to whether each emitter strip is positioned on the left edge or a travel lane of a roadway, on the right edge of the travel lane, or in a centerline of the travel lane. The informative data transmitted by each emitter strip may correlate to whether a portion of the travel lane proximate to the emitter strip is straight, curves left, curves right, inclines or declines. Still further, the wireless signal for one or more emitter strips in the plurality of emitter strips can include alert data correlating, for example, to the allowable direction of travel within a travel lane, contextual traffic data for the upcoming roadway proximate said emitter strip, the condition of the upcoming roadway, ad hoc speed reduction commands, and lane closures causing lane changeover for the upcoming roadway.

According to embodiments of the present disclosure, a roadway guidance system includes a set of emitter strips, each emitter strip emitting a wireless signal, wherein said set of emitter strips is disposed in spaced intervals along the centerline of a travel lane of a roadway. An antenna array located on a vehicle can interact with the emitter strips to position and maintain the vehicle relative to the emitter strips to keep the vehicle centered in the travel lane, or temporarily offset as required.

According to embodiments of the present disclosure, a roadway guidance system includes a first set of emitter strips, each emitter strip in said first set being configured to emit a first wireless signal, and a second set of emitter strips, each emitter strip in said second set being configured to emit a second wireless signal. In an embodiment of the present invention, the first set of emitter strips are configured to be disposed in spaced intervals along a first edge line of a travel lane of a roadway. The second set of emitter strips are configured to be disposed in spaced intervals along a second edge line of the travel lane of the roadway. An antenna array located on a vehicle can interact with the first and second sets of emitter strips to position and maintain the vehicle between the emitter strips, essentially keeping the vehicle centered in the travel lane.

According to embodiments of the present disclosure, a roadway guidance system includes emitter strips along the centerline of a travel lane of a roadway, and/or along the left and right edges of the travel lane. An antenna array located on a vehicle can interact with each set of emitter strips to position and maintain the vehicle centered in the travel lane.

An antenna array in accordance with embodiments of the present invention includes a plurality of antennas spaced relative to one another and laterally disposed on the vehicle relative to the direction of travel of the roadway. In accordance with preferred methods of operation, the antennas interact with emitter strips provided on a roadway to position the vehicle on the roadway and to adjust operation of the vehicle, as necessary, based on informative data received from the emitter strips. Preferably, the antenna array is positioned on the underside of the vehicle towards the front end of the vehicle. More preferably, the antenna array is positioned in front of the front axle of the vehicle. Preferably, the antenna array includes at least three antennas, with a first antenna positioned on the left side of the vehicle, a second antenna positioned on the right side of the vehicle, and a third antenna position in the center of the vehicle. More preferably, the antenna array includes five antennas with a first antenna positioned on the left side of the vehicle, a second antenna positioned on the right side of the vehicle, and third, fourth and fifth antennas being laterally disposed relative to the center of the vehicle.

An additional method of using a roadway guidance system in accordance with the present invention includes the steps of sending RF pulses from a vehicle (e.g., via the antennas in the antenna array), detecting, after the sending of the RF pulses, whether return signals are received at the vehicle, comparing the received return signals, and sending steering correction and supplemental data to a vehicle computer to adjust operation of the vehicle.

These and other objects, features and advantages of the present invention will become apparent in light of the description of embodiments and features thereof, as illustrated and enhanced by the accompanying diagrams.

DETAILED DESCRIPTION OF EMBODIMENTS OF THE INVENTION

Before the various embodiments are described in further detail, it is to be understood that the present disclosure is not limited to the particular embodiments described. It will also be understood that the methods and apparatus described herein may be adapted and modified as appropriate for the application being addressed and that the devices, systems and methods described herein may be employed in other suitable applications, and that such other additions and modifications will not depart from the scope thereof.

Although various features have been shown in different figures for simplicity, it should be readily apparent to one of skill in the art that the various features may be combined without departing from the scope of the present disclosure.

Figure 1:
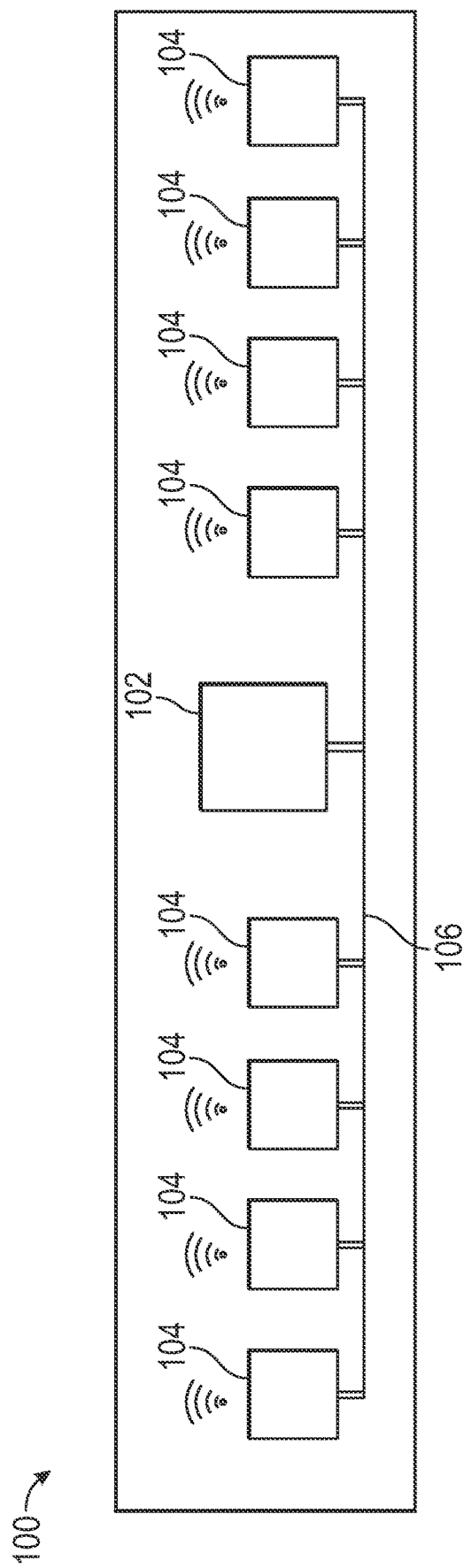
FIG. 1 shows an exemplary emitter strip according to embodiments of the present disclosure.

FIG. 1 shows an exemplary emitter strip 100 according to embodiments of the present disclosure. The emitter strip 100 includes an active emitter 102 operatively connected to a plurality of antennas 104 via a common radio frequency (RF) feedline 106. The active emitter 102 includes components and circuitry necessary to transmit instructions and/or signals to the antennas 104 through the feedline 106. Based on the instructions and/or signals from the active emitter 102, the antennas 104 are capable of simultaneously emitting one or more wireless RF signals (or other wireless signal type).

In accordance with embodiments of the present invention, a preferable emitter strip 100 may comprise a large surface area structure containing one or more antennas 104. In contrast to "RFID" or "Inventory Control" RF transponding tags, the emitter strips 100 used in the roadway guidance system of the present invention are preferably orders of magnitude larger than a typical RF transponding "tag," primarily due to the different purpose of, and design of, the antenna system in connection with operation of autonomous vehicles. While the emitter strips 100 may be self-powered (for example, via solar power), the emitter strips 100 are generally not self-powered. Instead, preferred embodiments of the emitter strips 100 rely on external excitation by energy pulses received from a passing vehicle, which can transmit such pulses from an antenna array 720 disposed thereon, as described in more detail below. Preferably, the energy pulses are RF transmission pulses. The energy pulses are captured, rectified, filtered, and turned into usable energy to power the active emitter 102. Unlike RFID and other types of transponding tags that only operate during contemporaneous excitation, the emitters 102 may possess an integral level of capacitance or other storage method sufficient in capacity to allow enough energy to be stored within the emitter 102 itself, or in connection with the emitter 102 (such as anywhere between the antenna output and a part of the active emitter), to ensure that there is sufficient power to allow the emitter 102 to complete one or more transmissions to a passing vehicle. In this regard, each emitter strip 100 contains transient energy storage components that can capture and subsequently utilize any excess excitation power.

The emitter strips 100 can be provided with different sizes, linear shapes, and/or operational lengths depending on various factors including, but not limited to: the type of roadway with which they are used, the amount of traffic generally experienced on the roadway, typical weather conditions for the roadway, and the general design and conditions of the roadway (e.g., curve, incline, decline, high-speed or low-speed, pavement or dirt road, etc.). The size and length of the emitter strips 100 and the active emitter 102, can also assist in keeping the emitters 102 adequately charged for intended operation. For example, long-length emitter antennas 104 (for example, up to approximately 10-20 feet in length) can capture multiple excitation pulses from each passing vehicle, as well as potentially adding concurrent pulses from other adjacent vehicles also being collectively received. Each emitter strip 100 further includes transient energy storage components that can capture and subsequently utilize any excess excitation power. The type of emitter/antenna selected for a particular roadway usage would be determined in part by the peak speed of the vehicles transiting the roadway. For example, with city streets designed for low traffic speeds, the emitter antennas 104 could be greatly reduced in length and still give the (slower) passing traffic ample opportunity to provide many pulses per passing vehicle than what a high-speed roadway (e.g., limited access highway) would offer (at highway speeds).

The emitter strip 100 can be a "centerline" strip—where a vehicle is designed to travel over a series of strips 100 positioned down the center of a travel lane, and utilize the methodology described herein to center the car over the series of strips in order to keep the vehicle centered within the travel lane. Alternatively, the emitter strip 100 can be used as either inside lane strips or outside lane strips—wherein the vehicle is designed to stay between the lane strips, keeping one series of strips to the left side of the vehicle and another series of strips to the right side of the vehicle, and ideally center the vehicle between them. In alternate embodiments, there may be only edge line strips. Still further, embodiments may simultaneously utilize a combination of all types of strips—that is, an inside emitter strip, an outside emitter strip, and a centerline emitter strip.

In operation of the roadway guidance system in accordance with embodiments of the present invention, a vehicle drives over or past emitter strips provided on a roadway. Wireless signals are exchanged between the emitter strip and the vehicle, which preferably includes an array of antennas that receive signals from each emitter strip, as described in more detail below. When an antenna on the vehicle receives a signal from an emitter strip, information is provided to a receiver apparatus comprising a controller, which can determine the vehicle's position relative to the centerline and/or edges of the travel lane in which the vehicle is travelling. Appropriate adjustments in the operation of the vehicle (namely, steering and braking) can be made.

Optimally, multiple types of emitter strips can be used to inherently build in redundancy. That is, if part of the roadway is compromised, such that signals are not readable from some emitters—perhaps due to road damage, snow drifts, or an obstruction—other emitters will still provide sufficient information so that a vehicle can be properly located within a travel lane on a roadway and safely and efficiently operated. In embodiments of the present invention, the emitter strips are disposed along a roadway in spaced intervals in a direction of travel, as generally illustrated in FIGS. 2-6. In embodiments of the invention, notably those using both centerline strips and edge line strips, the spacing of the emitter strips can be staggered—for example, between centerline strips and edge line strips. Additionally, the spacing of the strips can be altered depending on the section of the roadway where they are located and whether providing more frequent information via signals transmitted from the emitters would facilitate safe and efficient operation of the vehicle. For example, emitter strips can be spaced further apart from one another along straight sections of roadway, whereas strips can be positioned closer together along curved sections of roadway, especially along shaper curves. Similarly, emitter strips can be spaced closer together proximate stop sign, traffic lights, or merging lanes so as to provide greater opportunity to transmit informative data to the vehicle via such emitter strips.

Still further, emitters can be programmed to provide additional information based on their placement location on a roadway and characteristics of the roadway that may be upcoming for a moving vehicle. For example, emitter strips may notify a passing vehicle that the emitter is located on a straight section of road, or a curved section of the roadway. If the roadway is curved, the emitter strips can provide positional data, but also provide a "heads up" that the roadway is curving left or right, and further what the degree of curvature will be, so that the vehicle can brake and steer accordingly. Still further, emitter strips may notify a passing vehicle that the roadway is inclining or declining, and by how much and for how long, so operation of the vehicle can be adjusted and maintained accordingly. Still further, emitter strips may notify a passing vehicle of an upcoming merge, stop light, traffic light, and the like. Emitter strips may further be programmed in accordance with the present invention to provide temporal alerts via wireless signals sent therefrom—for example, information related to traffic or lane closures on the upcoming roadway, or information related to the condition of the upcoming roadway (e.g., accident, icy roadway, fallen tree, or the like), or the emitter strips 100 may carry pre-programmed information.

Figure 2:
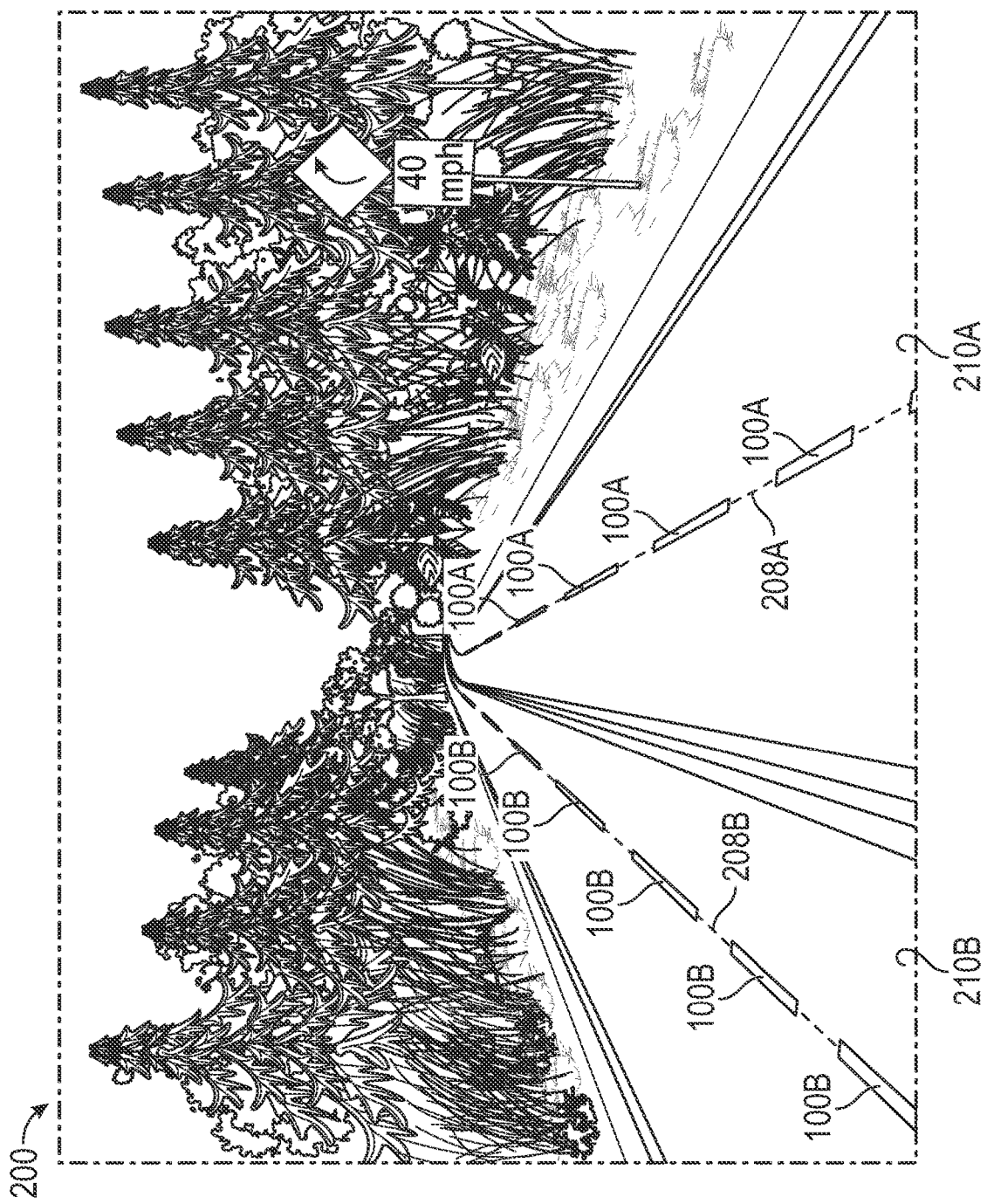
FIG. 2 shows components of a roadway guidance system configuration for a two-lane, two-way roadway according embodiments of the present disclosure having a plurality of the emitter strips of FIG. 1 installed.

FIG. 2 shows components of a roadway guidance system configuration for a two-lane, two-way roadway 200 with a plurality of emitter strips 100A, 100B disposed in spaced intervals along a centerline 208A, 208B of each travel lane 210A, 210B of the roadway 200 according to embodiments of the present disclosure. A first set of the plurality of emitter strips 100A is disposed in spaced intervals along the centerline 208A of one travel lane 210A of traffic of the roadway 200. Similarly, a second set of the plurality of emitter strips 100B is disposed in spaced intervals along the centerline 208B of the opposing travel lane 210B of traffic of the roadway 200. Roadway guidance system configurations like the configuration shown in FIG. 2 may be generally referred to as "center line guidance configurations." In such configurations, the vehicle drives over the emitter strips. In preferred operation of the roadway guidance system, the vehicle maintains its position relative to the emitter strips so that the vehicle is centered over the emitter strips as it moves along the travel lane.

Figure 3:
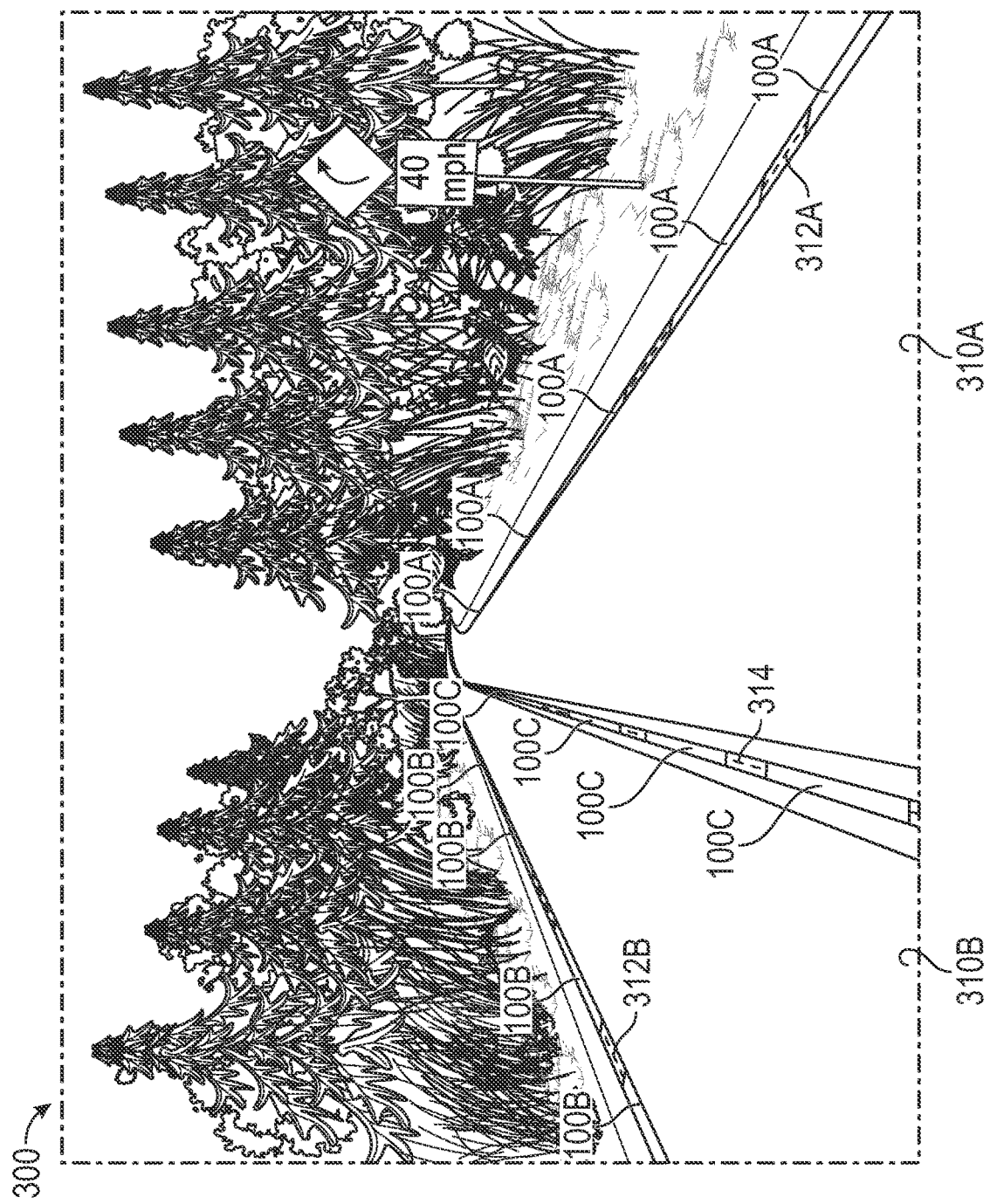
FIG. 3 shows components of another roadway guidance system configuration for a two-lane, two-way roadway according to embodiments of the present disclosure having a plurality of the emitter strips of FIG. 1 installed.

FIG. 3 illustrates components of another roadway guidance system configuration for a two-lane, two-way roadway 300 with a plurality of emitter strips 100A, 100B, 100C disposed in spaced intervals along edge lines 312A, 312B of each travel lane 310A, 310B and along a median line 314 separating the travel lanes 310A, 310B according to embodiments of the present disclosure. A first set of the plurality of emitter strips 100A is disposed in spaced intervals along the edge line 312A of the travel lane 310A, the edge line 312A being substantially near a boundary line for moving traffic of the travel lane 310A. Similarly, a second set of the plurality of emitter strips 100B is disposed in spaced intervals along the edge line 312B of the opposing traffic travel lane 310B, the edge line 312B being substantially near a boundary line for moving traffic of that travel lane 310B. A third set of the plurality of emitter strips 100C is disposed in spaced intervals along the median line 314 of the roadway 300. As shown, the median line 314 is a shared edge line of the two travel lanes 310A, 310B. Roadway guidance system configurations like the configuration shown in FIG. 3 may be generally referred to as "edge line guidance configurations." In such configurations, the vehicle drives between the emitter strips. In preferred operation of the roadway guidance system, the vehicle maintains its position relative to the edge line emitter strips so that the vehicle is between the inside and outside emitter strips, and more preferably centered between the inside and outside emitter strips as it moves along the travel lane.

Figure 4:
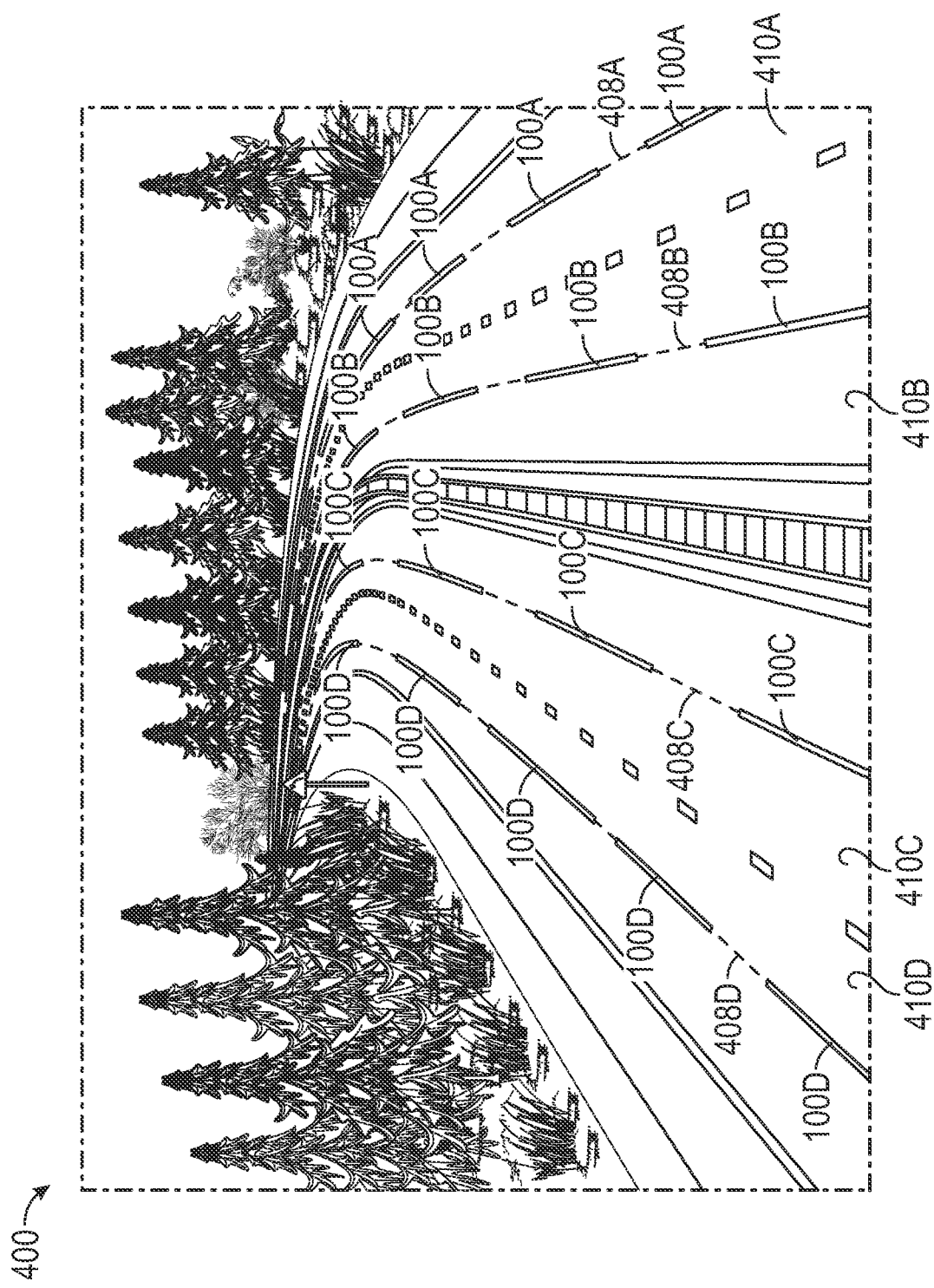
FIG. 4 shows components of another roadway guidance system configuration for a four-lane, two-way roadway according to embodiments of the present disclosure having a plurality of the emitter strips of FIG. 1 installed.

FIG. 4 illustrates components of another roadway guidance system configuration for a four-lane, two-way roadway 400 with a plurality of emitter strips 100A, 100B, 100C, 100D disposed in spaced intervals along center lines 408A, 408B, 408C, 408D of respective travel lanes 410A, 410B, 410C, 410D of the roadway 400, similar to the centerline guidance configuration shown and described above in connection with FIG. 2, according to embodiments of the present disclosure. As shown, the left-hand travel lanes 410C, 410D are opposing lanes of traffic relative to the right-hand travel lanes 410A, 410B. In the FIG. 4 embodiment, a first set of the plurality of emitter strips 100A and a second set of the plurality of emitter strips 100B are disposed in spaced intervals along the respective centerlines 408A, 408B of the right-hand travel lanes 410A, 410B. Similarly, a third set of the plurality of emitter strips 100C and a fourth set of the plurality of emitter strips 100D are disposed in spaced intervals along the respective centerlines 408C, 408D of the left-hand travel lanes 410C, 410D.

Figure 5:
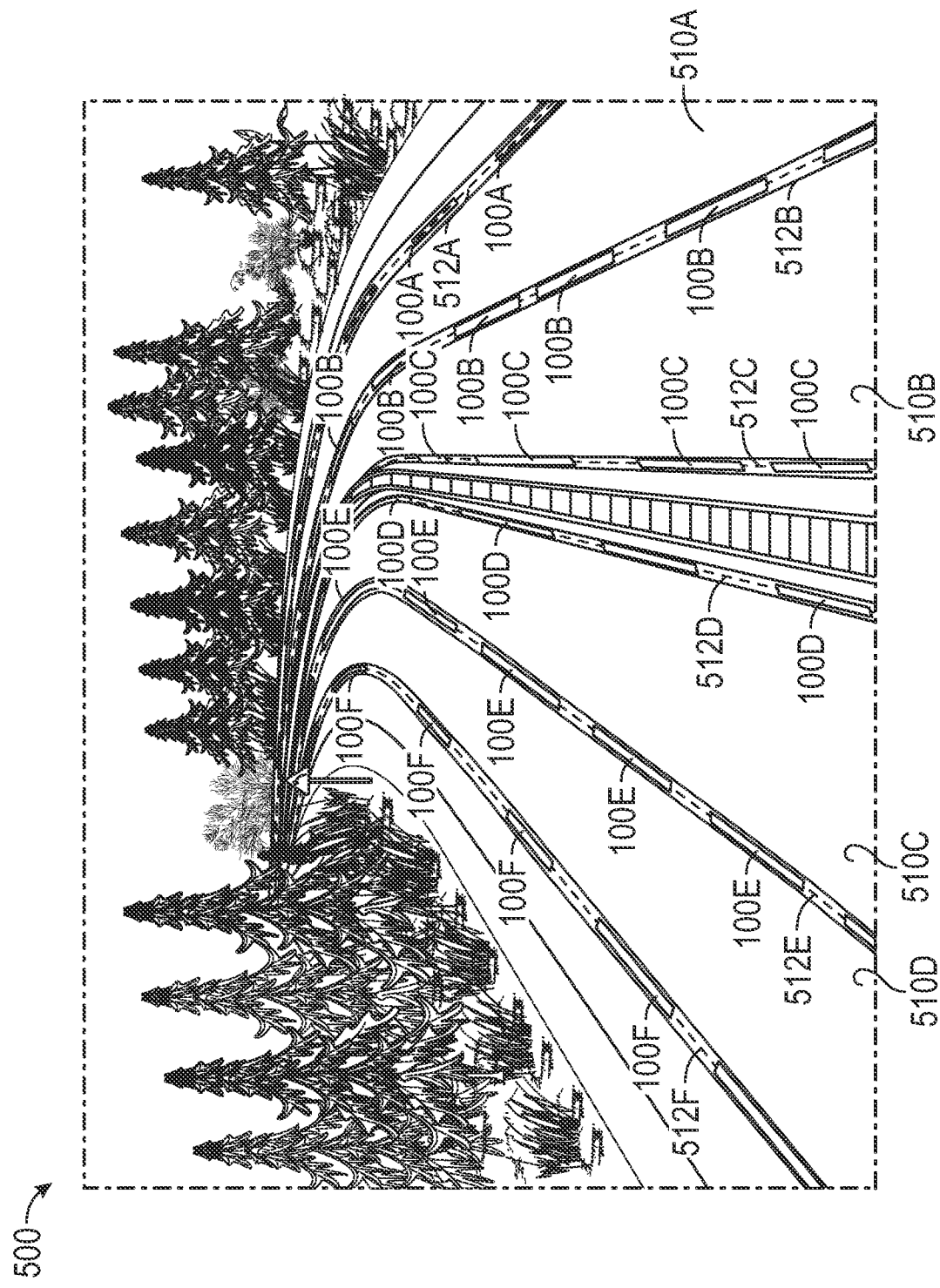
FIG. 5 shows another roadway guidance system configuration for a four-lane, two-way roadway according to embodiments of the present disclosure having a plurality of the emitter strips of FIG. 1 installed.

FIG. 5 illustrates components of another roadway guidance system configuration for a four-lane, two-way roadway 500 with a plurality of emitter strips 100A, 100B, 100C, 100D, 100E, 100F disposed in spaced intervals along edge lines 512A, 512B, 512C, 512D, 512E, 512F of each travel lane 510A, 510B, 510C, 510D, similar to the edge line guidance configuration shown and described in connection with FIG. 3, according to embodiments of the present disclosure. The left-hand travel lanes 510C, 510D are opposing lanes of traffic relative to the right-hand travel lanes 510A, 510B. For the right-hand travel lanes 510A, 510B, a first set of the plurality of emitter strips 100A is disposed in spaced intervals along one edge line 512A of one travel lane 510A, and a second set of the plurality of emitter strips 100B is disposed in spaced intervals along the other edge line 512B of the travel lane 510A, which is a shared edge line 512B with the adjacent travel lane 510B. A third set of the plurality of emitter strips 100C is disposed along the other edge line 512C of the travel lane 510B. Similar to the right-hand travel lanes 510A, 510B, for the left-hand travel lanes 510C, 510D, a fourth set of the plurality of emitter strips 100D is disposed in spaced intervals along one edge line 512D, and a fifth set of the plurality of emitters 100E is disposed in spaced intervals along the other edge line 512E of the travel lane 510C, which is a shared edge line 512E with the adjacent travel lane 510D. A sixth set of the plurality of emitter strips 100F is disposed in spaced intervals along the other edge line 512F of the travel lane 510D.

Figure 6:
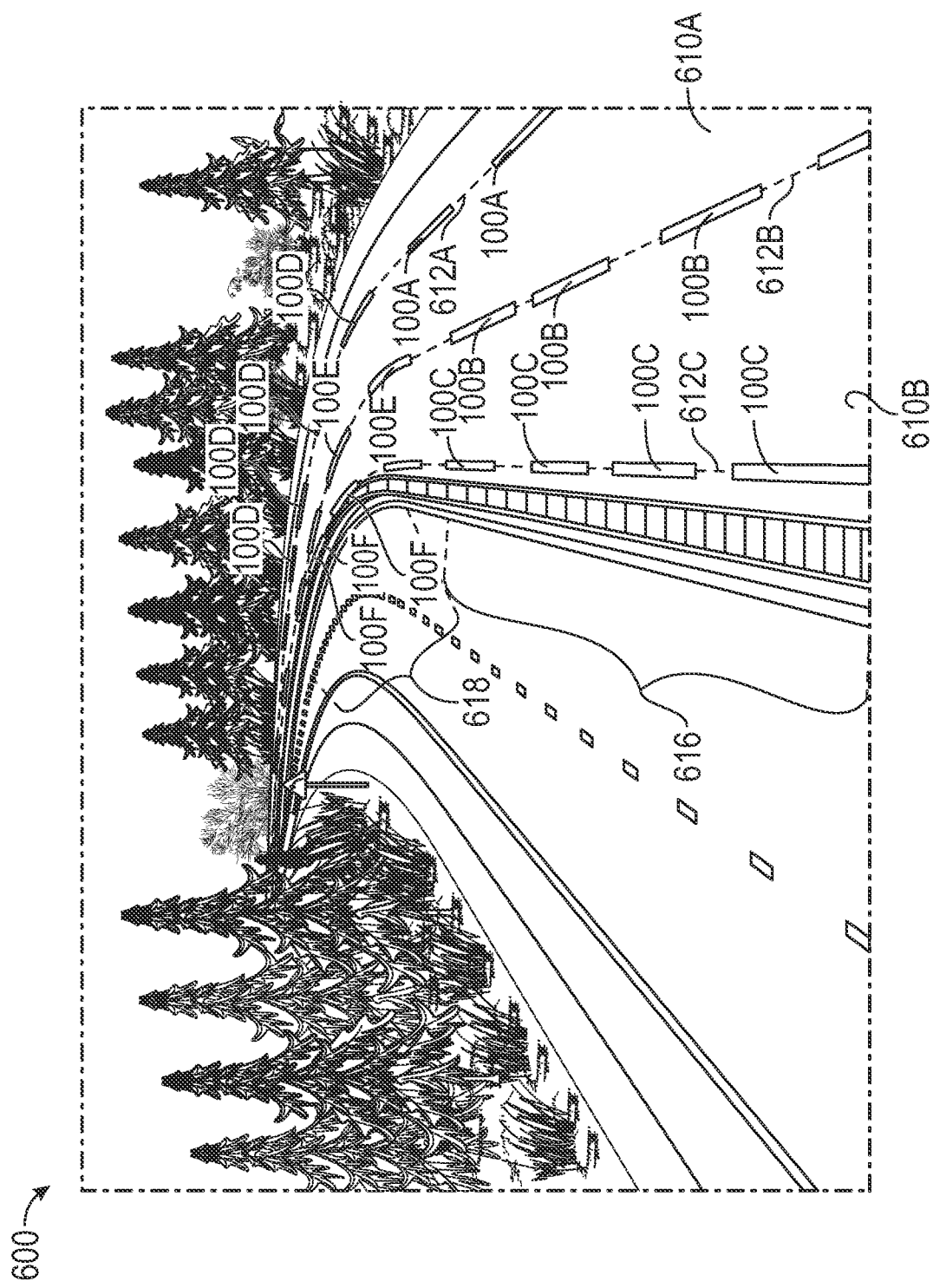
FIG. 6 shows another roadway guidance system configuration for a four-lane, two-way roadway according to embodiments of the present disclosure having a plurality of the emitter strips of FIG. 1 installed.

FIG. 6 illustrates components of another roadway guidance system configuration for a four-lane, two-way roadway 600 with a plurality of emitter strips 100A, 100B, 100C, 100D, 100E, 100F disposed in spaced intervals along edge lines 612A, 612B, 612C of the right-hand travel lanes 610A, 610B according to embodiments of the present disclosure. A first set of the plurality of emitter strips 100A is disposed along one edge line 612A of one travel lane 610A, and a second set of the plurality of emitter strips 100B is disposed in spaced intervals along the other edge line 612B of the travel lane 610A, which is a shared edge line 612B with the adjacent travel lane 610B. A third set of the plurality of emitter strips 100C is disposed along the other edge line 612C of the travel lane 610B. The first, second and third sets of the plurality of emitter strips 100A, 100B, 100C are disposed within a straight portion 616 of the roadway 600. Within a straight portion 616 of the roadway 600, the direction of travel of the travel lanes 610A, 610B is substantially straight.

The roadway 600, as illustrated, includes a curved portion 618. Within the curved portion 618 of the roadway 600, a fourth set of the plurality of emitter strips 100D is disposed in spaced intervals along the edge line 612A, and a fifth set of the plurality of emitter strips 100E is disposed in spaced intervals along the other edge line 612B of travel lane 610A. Also within the curved portion 618 of the roadway 600, a sixth set of the plurality of emitter strips 100F is disposed in spaced intervals along the other edge line 612C of travel lane 610B. Within a curved portion 618 of the roadway 600, the direction of travel of the travel lanes 610A, 610B is substantially curved.

The emitter strips 100 may be adhered directly to the surface of a roadway, and are preferably utilized in a sequential, in-line fashion. In alternate embodiments, the emitter strips 100 can be embedded flush within the roadway, or even fully or partially buried in the roadway if utilizing radio-frequency transparent covering material or covers flush with the roadway surface. As discussed above, emitter strips 100 may be used for two distinct purposes: (1) as a roadway "centerline" guide (centerline guidance), and/or (2) as an "edge of roadway" guide (edge line guidance). The specific type and material of roadway would determine which of several distinct types of emitter placement positions would be utilized. For example, for single-lane (in each direction) roadways (see FIG. 2) and roadways that have multiple travel lanes in each direction (see FIG. 4), emitter strips 100 could be placed over the middle of each travel lane. In other arrangements, emitter strips 100 can be provided along the roadway edge and/or between lanes, as illustrated in FIGS. 3 and 5. The use of edge of roadway emitter strips 100, preferably along with center of roadway emitter strips 100, is optimal for curves, especially sharp curves, to provide a passing vehicle with adequate information to maintain the vehicle within the travel lane and keep it from drifting into another lane. In accordance with the present invention, emitter strips 100 leading up to such curved portions of the roadway can provide the vehicle with informative data warning of the upcoming curve, while emitters in the immediate area of the curve would indicate the amount of curvature, the direction of the curve, and other information that will assist in safe operation of the vehicle. For temporary roadway lane definition, or as a guidance enhancement with built in redundancy, both center of lane and roadway edge emitters would be utilized.

As so illustrated, the provided emitter strips are effectively "guidance" emitters, designed to positioning the vehicle on the roadway and relative to the center and edges of a travel lane. In accordance with roadway illustrated in FIG. 6, such guidance emitters can be designated as "straight" emitters or "turning" emitters in relation to what the roadway is doing for a section of the roadway along which the vehicle is travelling. Still further, such curved emitters could be designated as "left turn" emitters and "right turn" emitters. As noted above, the "straight" emitters could be more spaced apart than "turning" emitters.

In specific connection with FIG. 6, the first, second and third sets of the plurality of emitter strips 100A, 100B, 100C may be referred to as "straight road" emitters. Straight road emitters may be configured to emit an RF signal indicating that the emitter source is a straight road emitter. The RF signal can alternatively indicate the emitter characteristic as being a straight road emitter by having a particular signal strength, signal frequency, signal type, coded instruction, or any other notifying means.

The fourth, fifth and sixth sets of the plurality of emitter strips 100D, 100E, 100F may be referred to as "turning" emitters. The turning emitters may be configured to emit an RF signal indicating that the source of an emitter signal is a turning emitter, or more specifically as a particular degree of turning emitter, the particular degree substantially corresponding to the degree of turn of the curved portion 618 of the roadway 600 where the turning emitter is installed. In the embodiment shown in FIG. 6, the turning emitters 100D, 100E, 100F may indicate, via emitter signal(s), that the turning emitters are 30 degree turning emitters since the degree of the turn of curved portion 618 of the roadway 600 is substantially 30°. Such turning emitters can also information the passing vehicle of the direction of the curved portion—that is whether the roadway turns left or right.

The emitters 100 according to the present disclosure may also be configured to provide other kinds of data to the passing vehicle. For example, the emitters 100 may be configured to provide an RF signal indicating road conditions upcoming within the travel lane of the roadway (or road data). These types of emitters may be referred to as "instructing" emitters. Emitters can provide indications of road conditions upcoming within the travel lane such as, without limitation, X-axis, Y-axis and Z-axis arrangement of upcoming emitters, change in spacing interval between upcoming emitters, or roadway shape and roadway surface type (e.g. pavement, gravel, and the like). Instructing emitters are not mutually exclusive from other emitter types/functions. Thus, an emitter strip 100 may simultaneously be, for example, a guidance emitter and an instructing emitter.

As noted above, active emitters 102 according to the present disclosure, when excited, provide useful information beyond the typical emanation of a RF signal used for simple radiolocation purposes. While emitters 102 according to the present invention indeed utilize emitter emissions for radiolocation purposes, as discussed herein, the emitters 102 also provide crucial additional guidance information in the form of a digitally modulated data stream (e.g., straight emitters, turning emitters, instructing emitters, and the like). While there are many fields of data that can be transmitted by the emitters 102, all of the emitters 102 used for the roadway guidance system, regardless of form and location, would transmit, at minimum, two critical fields. The first field is a contextual "usage type" field which indicates what type of emitter it is. Typical "usage type" responses would be "Center of Roadway", "Left Edge of Roadway", "Temporary Lane Shift—Right Edge", etc. This field is used by the Receiver Unit 724 (e.g., antenna array 720 and CAN bus 725) associated with an autonomous vehicle 700 to initially validate the incoming data information to confirm that the antenna location on a vehicle 700 (e.g., middle-central antenna 722C) is receiving the expected "Center" type emitter information before passing it on for processing. The second data field is used for identifying the emitter sub-type, which would be would generally be an informative contextual descriptor associated with the roadway, providing the vehicle 700 with a "heads up" of what is coming up on the road in normal conditions, such as, "straight roadway", "left turning at 30°", "decline in 100 feet", etc. This information can be cross-checked with other data such as GPS, steering position, optical inputs, etc., to provide additional redundancy/validation to the guidance system.

The third guidance method of the present invention uses the additional field information from an emitter's data transmission. Beyond an emitter 102 providing an ID "type" and "sub-ID" type, the emitter 102 can also provide additional contextual related information to allow guidance redundancy, or to directly command the autonomous vehicle 700. Additional fields can be used for implicit or explicit informational guidance or commands to be sent directly to the host-vehicle's guidance system. An example would be to temporarily re-route vehicular traffic around an accident scene or an obstruction in the road by placing temporary emitter strips 100 with high-priority hierarchy values, for example, as roadway flares are presently used. In this regard, emitters 102 could be programmed either remotely from a central "command center", or contemporaneously on-scene, to alert vehicles of dynamic conditions that would affect travel along certain routes. Autonomous vehicles 700 normally receive guidance data input from numerous sources such as on-board sensors, vehicle-to-vehicle (V2V) and vehicle-to-infrastructure (V2I) beacons, GPS, and the like. According to the present disclosure, additional or supplemental information can also be provided by the roadway emitters 102. For data input conflicts, as well as critical situational awareness by one or more vehicle data inputs, the guidance system must look to a command-level priority to select what input it deems most reliable and is assigned precedence. Emitter command messages would incorporate a numeric value corresponding to a position in the guidance "hierarchy" to establish priority. When a temporary condition is cleared, the emitter 102 can be reprogrammed or reset back to a default or "normal" setting.

While it is envisioned that a typical emitter strip configuration would be produced in the form of individual, very thin flat strips that would be adhered (rather than buried) to the roadway surface, alternate physical embodiments would be in the form of a flexible "roll out" fabric or plastic strip carrier deployed from a reel, or the use of a self-powered emitter 102 that would be connected to a length of "leaky" coaxial cable 106 which could easily form a temporary roadside edge definition on a temporary basis, as-needed, during road construction. These "temporary" emitter strips would possess the same functional capabilities as the fixed emitter strips generally described herein, and would be able to simultaneously provide boundary definition, as well as implicit or explicit speed, lane shift, lane split, or other instructions to an autonomous vehicle in accordance with the present invention. The temporary emitter strips could be linked in sections, with different self-powered sections, each containing different emitters 102 to vary speeds and/or instructions (e.g., adjust speed, shift lanes back, etc.) along the way. The emitters 102 would normally carry fixed output messages, but a variant with "on-site" flash memory capability could be easily substituted to allow ad-hoc program changes.

Figure 7A:
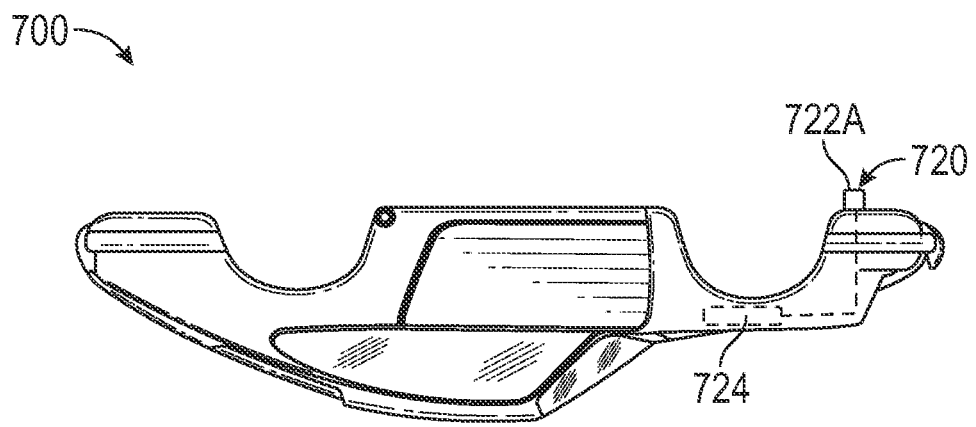
FIG. 7A shows a left, schematic view of a vehicle having an antenna array according to embodiments of the present disclosure.
Figure 7B:
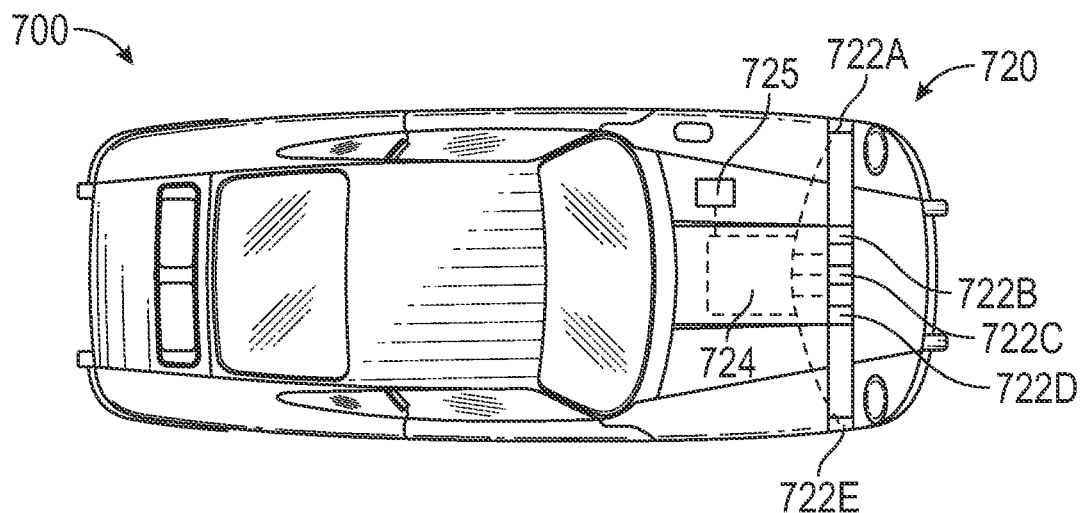
FIG. 7B shows a top, schematic view of the vehicle having an antenna array of FIG. 7A according to embodiments of the present disclosure.
Figure 7C:
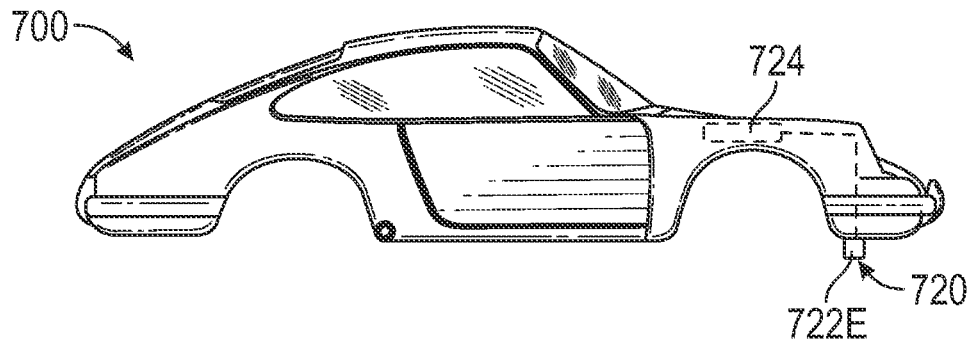
FIG. 7C shows a right, schematic view of the vehicle having an antenna array of FIG. 7A according to embodiments of the present disclosure.

Referring to FIGS. 7A, 7B and 7C, a vehicle 700 having an antenna array 720 in accordance with embodiments of the present invention is illustrated. As shown, the antenna array 720 includes a plurality of antenna receivers that interact with the emitter strips 100 as the vehicle 700 travels along a roadway provided with a series of spaced apart emitter strips 100. In the embodiment illustrated in FIGS. 7A-7C, there are five antennas 722A, 722B, 722C, 722D, 722E (collectively receivers or antennas 722), though more or fewer antennas may be used without departing from the spirit and principled of the present invention. Indeed, additional antennas could be added for even higher resolution. Preferably, an antenna array comprises a left edge antenna, a right edge antenna, and at least one centrally located antenna.

In accordance with the present invention, the antennas 722 are configured to each individually and/or collectively detect signal(s) from emitter strips 100, such as the emitter strip of FIG. 1. The antennas 722 are spaced relative to one another and laterally disposed on the vehicle 700 from left to right relative to the direction of travel. As shown, one antenna 722A is substantially near the left most side of the vehicle 700 and one antenna 722E is substantially near the right most side of the vehicle 700. The left most and right most antennas 722A, 722E may be referred to generally as "outboard" antennas. As further illustrated, three central antennas 722B, 722C, 722D are positioned in a substantially central portion of the vehicle 700 from left-to-right. Despite being central antennas, one or more antennas may be left-central antennas 722B being positioned closer to the left side of the vehicle 700 than the right, and one or more antennas may be right-central antennas 722D being positioned closer to the right side of the vehicle 700 than the left. One or more central antennas 722C may be positioned substantially central to the vehicle in a left-to-right direction. Such antennas 722C may be referred to as middle-central receivers.

The central antennas 722B, 722C, 722D may be closely spaced, while the outermost antennas 722A, 722E may be separated from each other by as much space as possible. In embodiments, each antenna 722 may be preset in its orientation, and optimized to a specific angle and direction. The antennas 722 would be of high-gain design to narrow the 3 db beamwidth. Of the five antennas 722, the center three (722B, 722C, 722D) may be angled downward, while the two "outboard" antennas 722A, 722E may be vertically angled towards each respective roadway edge, while being horizontally oriented at a 90° angle relative to the center line of the host vehicle. As so oriented, the central antennas are designed to receive signals from emitter strips 100 in the centerline of a travel lane, whereas the outboard antennas are designed to receive signals from respective left and right edge line emitter strips.

Preferably, the antenna array 720 is position on the underside of the vehicle 700 towards the front end of the vehicle 700. More preferably, the antenna array 720 is positioned in front of the front axle of the vehicle 700.

Preferably, the antennas 722 used in the antenna array 720 are directional antennas, whose design characteristics may be altered depending on application and need. Each antenna 722 utilizes a dedicated coaxial cable that connects to a corresponding dedicated input port on a receiver unit 724.

The antenna array 720 is used to locate the vehicle 700 along a roadway equipped with positional and informative emitter strips 100. Each antenna 722 can individually interact with emitter strips 100 to gather positioning data and work collectively with a central "brain" to compare such individually obtained information and adjust operation of the vehicle 700 accordingly (such as, straighten out the vehicle 700 relative to the centerline of the travel lane, the left and right edge lines of the travel lane, and any obstacles or hazards in the roadway). In this regard, the antennas 722 are individually and/or collectively connected to a receiver unit 724, which includes or is operatively connected to a CAN bus 725, i.e., the "brains" of the vehicle's guidance functionality. In embodiments, the receiver unit 724 and CAN bus 725 are integral such that they may be considered a single unit. Preferably, the receiver unit 724 is configured to receive and process signals from the antennas 722. The processed signals are sent to the CAN bus 725, which provides driving commands and/or course corrections to the autonomous or quasi-autonomous vehicle's 700 transportation functions, including without limitation, commands governing the vehicle's speed, acceleration, deceleration, steering, braking, anti-lock braking system, and the like.

In operation, when the vehicle 700 of FIGS. 7A-C is traveling on a roadway having a centerline guidance configuration, such as the roadway configuration shown in FIG. 2, the central antennas 722B, 722C, 722D being centrally positioned on the vehicle 700 can detect signals transmitted from the plurality of emitter strips 100A disposed along the centerline 208A of the roadway. In normal operation, when the vehicle 700 is centered over emitter strips 100A, the central antenna 722C would receive a signal level higher than the left-central antenna 722B or the right-central antenna 722D, and no steering correction command would be given to the vehicle 700 by the receiver unit 724. If the vehicle 700 drifted too far to the right, then the left-central antenna 722B would detect a signal(s) from one or more of the emitter strips 100A, on a comparatively stronger signal basis than detected by the central antenna 722C and the right-central antenna 722D. Similarly, if the vehicle 700 drifted too far to the left, then the right-central antenna 722D would detect a signal(s) from one or more of the emitter strips 100A, on a comparatively stronger signal basis than detected by the central antenna 722C and the left-central antenna 722B. Thus, any deviations from a central alignment in the travel lane 210A are detected by the antennas and determined by the receiver unit 724, which sends correction data to the CAN bus 725. Indeed, all three central received 722B, 722C and 722D can receive signals and the respective strengths of the signals, as related to which antenna received which signals, can be used to determine the location and positioning of the vehicle relative to the optimal centerline of the travel lane.

When the vehicle 700 of FIGS. 7A-C is traveling on a roadway having an edge line guidance configuration, such as the roadway configuration shown in FIG. 3, the outboard antennas 722A, 722E being positioned on the left most and right most sides of the vehicle 700 can detect signals transmitted from the plurality of emitter strips 100A, 100C along the edge line 312A and median line 314 that bound the travel lane 310A. If the vehicle 700 drifts too far to the right, then the right outboard antenna 722E would detect a signal (s) from one or more of the emitter strips 100A positioned along the right edge line 312A at a higher signal level than one or more of the emitter strips 100A positioned along the right edge line 314. Such signals can be used to determine the vehicle's positioning relative to the right edge of the travel lane and adjust the vehicle's positioning accordingly. Similarly, if the vehicle 700 drifts too far to the left, then the left outboard antenna 722A would detect a signal(s) from one or more of the emitter strips 100C along the median line 314. Likewise, such signals can be used to determine the vehicle's positioning relative to the left edge of the travel lane and adjust the vehicle's positioning accordingly. Optimally, the receiver unit 724 can compare signal levels received from the left and right antennas 722A and 722E, respectively, and send a corrective command to the CAN bus 725. In this mode, the receiver unit 724 looks for equal antenna outputs from the left and right antennas 722A and 722E, and positions the vehicle 700 so that it is centered between the left and right edges of the travel lane resulting in a re-establishment of balanced input signal levels to the receiver unit 724. Thus, any deviations from a central alignment within a travel lane or an alignment relative to the edges of the travel lane 310A are detected and accounted for. The operation is substantially the same for the vehicle 700 traveling on a roadway having an edge line guidance configuration with multiple lanes traveling in the same direction, such as the roadway configuration shown in FIG. 6.

In accordance with embodiments of the present invention, all the antennas 722 in the antenna array 720 may be used to receive signals from all emitter strips 100 in a roadway, regardless of whether the emitter strips 100 are positioning in the centerline, left edge lien or right edge line of a travel lane. The receiver unit 724 would compare the signals received by each antenna 722 in order to optimally determine the vehicle's position within a travel lane.

Figure 8:
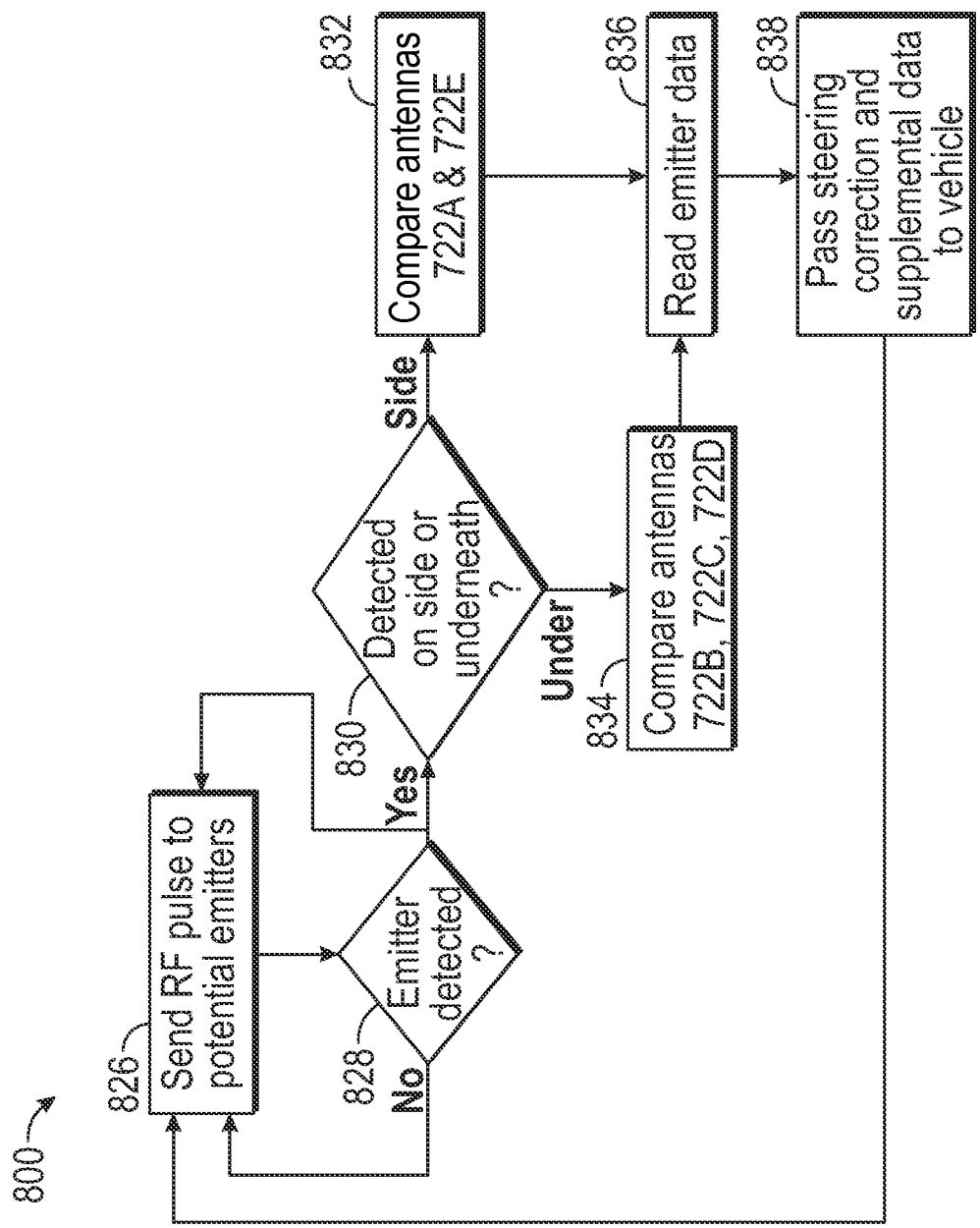
FIG. 8 shows a flow diagram of an exemplary method for using a roadway guidance system according to embodiments of the present disclosure.

FIG. 8 shows a flow diagram of an exemplary method 800 configured to be employed by a receiver unit 724 according to embodiments of the present disclosure. The method 800 begins at block 826 with the ports of the receiver unit 724 sending an RF pulse(s) to potential emitters (e.g. emitter strip 100 of FIG. 1). Then, at block 828, the receiver unit 724 detects via antennas 722 whether a return signal from any emitter(s) is received. If No, the method returns to sending RF pulse(s) to potential emitters (block 826) and again to block 828 for detecting return signal(s). If Yes, then at block 830, the receiver unit 724 determines whether the detected signal(s) were received on a side of the vehicle via outboard antennas (e.g. left antenna 722A and right antenna 722E of FIG. 7) or underneath the vehicle via one or more central antennas (e.g. central antennas 722B, 722C, 722D), or alternatively, determining the relative position of each antenna 722 relative to an emitter strip 100 from which a signal is received. Still further, the receiver unit 724 can determine the strength of the signals received for each antenna 722, which may also be used to determine relative positioning information.

If the receiver unit 724 determines that a signal was received from a side of the vehicle 700 by an outboard antenna 722A, 722E, then, at block 832, the receiver unit 724 compares channels dedicated to each outboard antenna 722A, 722E. If the receiver unit 724 determines the left outboard antenna 722A received the signal (or received the signal at a greater signal strength level than the right outboard antenna 722E), then the receiver unit 724 determines that the vehicle 700 is misaligned in the travel lane towards the left. Similarly, if the receiver unit 724 determines the right outboard antenna 722E received the signal at a greater signal strength level than the left outboard antenna 722A, then the receiver unit 724 determines that the vehicle 700 is misaligned in the travel lane towards the right. This guidance method, if enabled, works in conjunction with a comparator circuit that constantly monitors the differential RF receive levels of the outboard antennas. If the two outputs are identical, indicating equal signal levels received by each antenna 722A, 722E which equates to equal distances left and right from their respective edge line emitters, then the receiver unit 724 does not provide any corrective guidance to the vehicle 700 through the CAN bus 725. If the relative signal levels become imbalanced, indicating a drift to one side or the other, corrective guidance is given to the driver or autonomous vehicle, as is discussed in greater detail below.

If the receiver unit 724 determines that a signal was received from underneath the vehicle 700 by a central antenna 722B, 722C, 722D, then, at block 834, the receiver unit 724 compares the channels dedicated to each central antenna 722B, 722C, 722D. If the receiver unit 724 determines a left-central antenna 722B received a signal at a greater signal strength than the middle-central antenna 722C and right-central antenna 722D, then the receiver unit 724 determines that the vehicle 700 is misaligned in the travel lane to the left. Similarly, if the receiver unit 724 determines a right-central antenna 722D received a signal at a greater signal strength than the middle-central antenna 722C and left-central antenna 722B, then the receiver unit 724 determines that the vehicle 700 is misaligned in the travel lane to the right. If the receiver unit 724 determines a middle-central antenna 722C received a signal at a greater signal strength than the left-central antenna 722B and the right-central antenna 722D, then the receiver unit 724 determines that the vehicle 700 is not misaligned.

As noted, the receiver unit 724 can receive signals from each antenna 722 relating to multiple emitter strips 100 and coordinate the received information to determine the position of a vehicle 700 within a travel lane in order to provide an operational redundancy. That is, a central antenna—such as antenna 722C as illustrated in FIG. 7A—can receive signals from a centerline emitter strip, a left edge emitter strip, and a right edge emitter strip. The receiver unit 724 can determine the position of the antenna 722C relative to each emitter strip 100 from which a signal was received. Similarly, vehicle positioning can be determined for each of the outboard antennas (e.g., 722A and 722E), as well as the other central antennas (722B and 722D). The receiver unit 724 can use all of the information to determine and confirm the position of the vehicle 700. If, for example, the outer edge of a roadway is compromised—such as by a snow drift or damage—such that signals are not being transmitted by a buried or damaged emitter strip, then the data measured at each antenna with respect to other emitter strips on the roadway could still be used to accurately locate the vehicle 700.

After either block 832 comparing outboard antennas 722A, 722E and/or block 834 comparing central antennas 722B, 722C, 722D, the process proceeds to block 836 where the receiver unit 724 reads the data associated with the received signal(s), regardless of which antenna 722 obtained the signal(s). As discussed above, the signals from emitter strips 100 may be encoded with indications that the emitter strip 100 is a guidance emitter (such as, a straight emitter or a turning emitter), or an instructing emitter. Based on the comparison blocks 832, 834 and the reading block 836, the receiver unit 724 at block 838 passes steering correction and supplemental data via the CAN bus 725 to an onboard vehicle computer responsible for transportation functions. In embodiments, the onboard computer may be integral with the receiver unit 724.

Accordingly, depending on which antenna 722 registered detection of a signal(s), the receiver unit 724 can determine what guidance methodology is passed to the vehicle transportation functions, e.g. centerline guidance or edge line guidance methodology. Additionally, depending on the difference in proportionality of the received signal strength amongst the antennas 722, the CAN bus 725 can inform the steering correction data sent to the vehicle transportation functions.

After passing the steering correction and supplemental data to the vehicle 700 at block 838, the process can return to block 826 to repeat the process again. However, as shown in by the forking arrow after the detection block 828, other process(es) can be happening simultaneously or substantially simultaneously during the process steps described above in connection with blocks 830, 832, 834, 836, 838.

The supplemental data described in connection with block 838 can include information from the indications contained in the received signals. For example, if X-axis, Y-axis and Z-axis indications were received from an instructing emitter strip, then the receiver unit 724 may determine upcoming features of the roadway, such as an incline, a decline, an S-curve, a right turn, a left turn, or the like. The receiver unit 724 can provide this supplemental information to the transportation functions of the vehicle 700 so that the vehicle 700 smoothly steers and/or accelerates or decelerates as appropriate. In another example, the instructing emitter strip 100 may indicate an upcoming roadway surface change, such as from pavement to gravel. The receiver unit 724 can send that information to the vehicle travel functions of a vehicle computer so that the vehicle 700 begins to decelerate before the roadway surface change. Thus, the supplemental information provides the CAN bus 725 the opportunity to "anticipate" the vehicle's next actions instead of instructing the vehicle to "react" to roadway conditions.

The receiver unit 724 can be configured to provide commands and/or course correction instructions to the vehicle transportation functions via the CAN bus 725 to cause the vehicle 700 to realign within a travel lane, or stop the vehicle 700 if such realignment is not possible. Alternatively, if the vehicle 700 is being driven by a human driver, the CAN bus 725 can provide a notifying signal to the driver indicating misalignment. The notifying signal can include the direction and degree of misalignment. The notifying signal discussed above for notifying a driver of misalignment can be any kind of visual, audible, or haptic signal, or any combination thereof.

Figure 9:
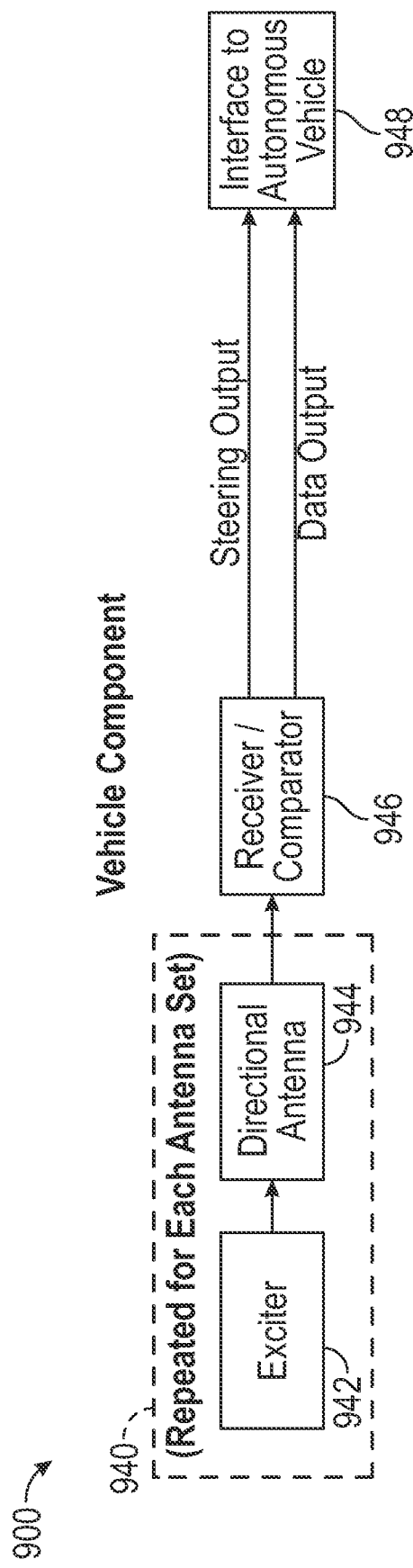
FIG. 9 shows a schematic illustration of components of a roadway guidance system that may be associated with a vehicle according to embodiments of the present disclosure.

FIG. 9 shows a schematic illustration 900 of components that may be associated with a vehicle 700 according to embodiments of the present invention. Each antenna 722 (FIG. 7) may comprise a component unit 940. The component unit 940 comprises an exciter 942 and a directional antenna 944. The component unit 940 is operatively connected to a port of a receiver/comparator 946. The receiver comparator 946 is configured to output steering output and/or data output to an interface 948 of autonomous vehicle 700.

Figure 10:
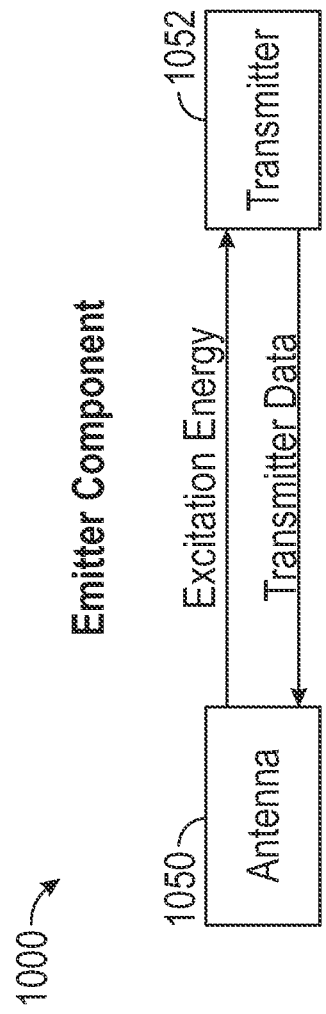
FIG. 10 shows a schematic illustration of components of an exemplary emitter strip of a roadway guidance system configured to be installed on a roadway according to embodiments of the present disclosure.

FIG. 10 shows a schematic illustration 1000 of components of an exemplary emitter strip (e.g., emitter strip 100 of FIG. 1) configured to be installed on a roadway according to embodiments of the present invention. The emitter strip 100 may include one or more antennas 1050 (e.g., antenna 104 of FIG. 1) operatively connected to a transmitter 1052 (e.g., active transmitter 102 of FIG. 1). The antenna(s) 1050 is configured to transmit excitation energy to the transmitter 1052. The transmitter 1052 is configured to transmit transmitter data to the antenna(s) 1050. The excitation data and transmitter data may be exchanged via a feedline (e.g., feedline 106 of FIG. 1).

Thus, in accordance with a method of using the roadway guidance system in accordance with the present invention, excitation energy pulses, preferably RF pulses, are transmitted from a vehicle 700 (e.g., via the antennas 722 in the antenna array 720 disposed thereon), detecting, after the sending of the energy pulses, whether return signals are received at the vehicle 700, comparing the received return signals, and sending steering correction and supplemental data to a vehicle computer to adjust operation of the vehicle.

The receiver unit 724, therefore, is provided for processing data transmitted to the antenna array 720 from the emitter strips 100. All RF ports on the exciter/receiver/data decoder unit (e.g., receiver unit 724 of FIG. 7) function in the generally same manner. Each port is internally connected to a common exciter's output. The exciter's design is similar in operation to radar transmitters in that they produce extremely high peak output power bursts, but at a very low duty cycle. For this application, an appropriate peak power/pulse repetition rate is chosen to create a high enough average power level to sufficiently excite the emitters 102 as the vehicle passes by. The exciter of the vehicle 700 also has the ability to dynamically vary its average output power level so as to increase the average excitation power output level during conditions where periods of rain, snow, ice, or other physical causes such as leaves attenuate RF signals to/from the emitters 102. All of the Receiver Unit channels are set to matched received sensitivity levels, with said sensitivity high enough to allow for an appropriate fade margin from the emitters 102. The receiver equipment in the vehicle 700 constantly monitors the overall average received levels summed from all channels to ascertain any deviation from the normally expected received signal levels. In the event the average received signal levels fall below a pre-set point (indicating pathway attenuation), the excitation equipment would automatically increase the pulse repetition rate commensurate to the signal path loss to boost the average transmitted excitation level to the emitters.

The excitation RF transmissions and the emitters 102 preferably have the capability to operate on different frequency bands. Typically, both excitation and received data would operate within the same band, so the path attenuation is assumed to be equal for both pathways, thus validating the adjustment of average excitation power by monitoring the received signal levels. The excitation frequency and the data frequency would be offset from one another by a fixed amount, allowing the hi-Q receiver channels to also incorporate sharp notch filters to attenuate the excitation frequency to allow full duplex operation. In the alternative, the separate excitation transmitter and receivers would be fed through an electronic transmit/receiver (T/R) switch.

The five discrete antenna outputs in accordance with an embodiment of the present invention would feed five discrete receiver RF input ports of the Receiver Unit 724. The Receiver Unit 724 can simultaneously function, and provide vehicular guidance, in one or more of three different ways. Assuming that the antennas and channels are designated from left to right of the vehicle as 722A, 722B, 722C, 722D, 722E as in FIG. 7, the center antennas/channels would therefore be known as channels 722B, 722C, 722D representing "left-center", "center", and "right-center" respectively. Channels 722B, 722C, 722D would be used with roadways that have emitting elements along the centerline of a travel lane or roadway. The system's overall guidance mission is to, in the absence of other steering commands, direct and keep a vehicle 700 over the centerline position of a roadway or the travel lane as it travels.

Advantageously, the methods and systems disclosed herein can be configured to work with both human driven as well as autonomous types of vehicles. For driven vehicles, the guidance can be provided in the form of visual, audible, or haptic alerts via the steering wheel (or other element) to a vehicle's driver, or directly providing "steering assist." In the case of an autonomous vehicle, steering guidance instructions are provided directly to a host vehicle's guidance system. As the vehicle is guided back over the centerline, the vehicular or driver guidance may stop. This guidance method may be disabled if "center of travel lane" emitter strips have not been installed on the travelled roadway as it would result in the comparators all seeing the same (zero) signal level.

All of the array's antennas 722 may be utilized during certain operations such as a commanded lane change to provide additional signal and emitter type information for the Receiver Unit 724. In that event, the comparator circuits (and subsequent outputs) may be disabled, however, during the pendency of such a maneuver until the receiver unit channels have reacquired the correct ID types in the new lane.

A receiver/data decoder interface unit as part of the receiver unit 724 contains a "look-up table" (or reference table) which not only recognizes and translates an emitter's primary "type" code, but also processes the emitter's additional secondary or tertiary codes, where provided, that are useful for vehicular guidance such as a code that translates to "continue straight", or a code that translates to "begin a 10° turn to the left", or a code that translates to "turn 30° to the right, etc. For certain circumstances, the emitters 102 can transmit a "type," "additional information field 1," "additional information field 2," etc. It is envisioned that such extra emitter fields would be used for situations where a simple "one-way" street meaning is not enough. An emitter 102 that just indicated "one way" would not allow an autonomous vehicle the ability to know if it were going the correct way on that street (assuming no unrelated additional system providing visual references of a directional sign, other roadway vehicle's travel direction, parked cars, etc.). With a roadway guidance system in accordance with the present invention, each emitter 102 on a one-way street may provide three levels of data: a "type" ID (e.g. "street information"), a context meaning (e.g. "one-way" street), and a numeric field that consists of a single unique sequence number. After the receiver unit 724 recognizes that it is receiving codes indicating the roadway is one-way, it would then uniquely analyze the numeric field of each emitter strip 100 it passes to see if the numeric field was increasing. If this were the case, then the system would know that the vehicle 700 was traveling in the correct direction. If the numeric field were decrementing, the receiver/data decoder interface unit would recognize that the vehicle 700 was heading in a reverse street direction and command the autonomous vehicle to immediately turn around. In the case of a driven vehicle, the system would immediately sound warning alarms, dashboard messages, and voice annunciation such as "Warning, you are going the wrong way on this road!"

The receiver unit 724 may also receive information from emitters 102 about upcoming road intersections, and road sign information, and have the ability to pass that information to the driver or the guidance system of an autonomous vehicle. The vehicle 700 could receive information about the upcoming intersection or road sign well in advance, and recognize a decrementing number to determine the proximity to the sign or intersection.

While the comparator systems of the system can give precise instantaneous guidance to a vehicle 700, additional information coding in the emitters 102 (e.g., when received by the receiver/data decoder interface unit) also serves as a redundant guidance system should for any reason the comparator system(s) malfunction or fail, as the vehicle 700 would still have a backup method of guidance. Just receiving the emitter's primary "type" code ("continue straight," "start 30° left turn," etc.) would greatly assist an autonomous vehicle in maintaining a "center of roadway" position during "white-out" or visually impaired situations where a visual or LIDAR guidance system would be seriously compromised or rendered non-functional.

If, for example, the receiver unit 724 sensed continuing un-commanded vehicular movement misaligning to the right (e.g., as sensed by an increasing receiver 722E level imbalance with channel 722A, which was preceded by an increasingly higher channel 722B signal level) which continued contrary to what the expected vehicle positioning should be, then followed by receiver channels starting to receive wrong ID types (such as would occur if a vehicle 700 drifted in its lane to the point where the center antenna(s) 722 were picking up "side of roadway" IDs, then the vehicle 700 could be assumed to be out of control and a "Skid" protocol could be invoked. The Skid protocol could follow the generally accepted guidelines for vehicular recovery operations in a skid, which would include corrections to steering direction, propulsion level, and braking level. Through the CAN bus 725, the receiver unit 724 may also monitor and react to the vehicle's wheel orientation via rotation sensors. A roadway may be equipped with only roadway edge guidance, or in the alternative, only centerline guidance emitters. As the emitters 102 indicate which type they are (e.g., roadway edge or centerline), if (centerline) channels 722B, 722C, 722D were to indicate the highest signal reception of a "side of road" emitter, then the system would know that the vehicle 700 had gone partially off the roadway in a particular direction and initiate a recovery protocol in response.

The roadway guidance system may also be extremely useful for unusual or atypical roadway situations. The emitter type in a "traffic circle" or "roundabout" would let the system notify the vehicle's primary guidance system to be aware that it was in a roundabout, and to modify the vehicle's "normal" behavior so as to follow roundabout right-of-way protocols, and instead of operating in a "typical" exiting pattern and speed, it may allow atypical rapid turns and exiting of a vehicle 700 from the roundabout. Similarly, when confronted with a roadway that forks, the emitter codes would let the IRGS-equipped vehicle deal with the unusual guidance shift that would be required. Additionally, for those streets that are one-way only at certain times of the day or week, the codes in the emitters 102 would cause the receiver unit/decoder 724 to make a comparison between the emitter's stated time parameters and the real-time clock in the system and take guidance action if there is a time match.

In a similar fashion, in contrast to "non-improved" emitters merely indicating, for instance, a school zone speed limit, the receiver unit/decoder 724 would also invoke in a host vehicle a "school zone" protocol which would give heightened sensor sensitivity/priority to people/objects entering a perimeter zone around the vehicle, along with faster braking response times. As with the previous example, that protocol could be disregarded if it were outside of the emitter's school hour information.

The roadway guidance system in accordance with the present invention may also be used for temporary roadway construction situations where vehicles are required to alter speed, shift, traffic lanes, etc. Construction areas can present extreme challenges to "normal" autonomous vehicle guidance programming. With the system according to the present disclosure, just as today orange traffic cones are temporarily placed to create temporary lane guidance, temporary emitter strips 100 or "leaky" coaxial cable (either merely laid on the road surface or using removable adhesive) fed by self-powered emitters 102 would be placed on the edges of a construction-altered travel lane. Just as signs are placed today at the start of a construction zone to indicate important "temporary" altered driving requirements such as "reduce speed to X," "lane narrows," etc. to inform a driver, the system similarly informs the autonomous vehicles 700 of the requirement to temporarily change their "usual" operating parameters. The emitters 102 in this situation would indicate it being a "construction zone" type, and the additional information field(s) would invoke a number indicating which of several construction protocols was being invoked. The invoked protocol would skew the vehicle's usual autonomous programming guidance in a number of ways, such as capping the maximum speed allowed in such a zone, alter the lane-keeping guidance parameters to allow competent operation in a narrower than normal lane (especially important when operating between "Jersey Barriers" that would utterly confuse many visual and LIDAR systems), alter visual guidance systems to allow "crossing" marked roadway lines of normally forbidden to cross center lanes, "breakdown" lanes and areas, etc. Since an IRGS-equipped vehicle 700 might encounter conflicting information between those emitters 102 that are permanently placed in the normal travel lanes and the temporary emitters 102 that are in the area, the temporary emitters 102 would have a higher priority status that would overrule the existing field emitters.

The autonomous vehicle industry has also become aware of a phenomenon wherein a large segment of autonomous vehicle passengers experience adverse physiological reactions such as nausea caused by sudden rapid movements of the vehicle. While autonomous vehicles are generally capable of quite rapid guidance corrections and movement, roadway guidance system in accordance with the present invention incorporates a novel "anti-nausea" system in which a purposeful speed-dependent correction is incorporated into the receiver unit 724 to minimize the perceived movement of an IRGS-equipped vehicle 700 by altering the correction timing, correction speed, and path deviation threshold limits. These damping parameters may be configured to change depending on the forward speed of the vehicle 700.

An alternative method for determining the position of a vehicle 700 in accordance with the present invention utilizes the outboard antennas 722A and 722E of the antenna array 720 to measure "time of arrival" characteristics of transmitted signals corresponding to emitter strips 100 along the roadway's edge relative to the timing of the excitation energy pulses transmitted from the antennas 722A ad 722E. Utilizing this alternate method, if the vehicle 700 were centered in the travel lane, there would be an equal propagation delay from both left and right road-side emitter strips 100. As the vehicle 700 drifts closer to one side or the other, the corresponding propagation delay would decrease, creating a timing imbalance, which the receiver unit 724 would utilize to adjust the vehicle steering.

In summary, the emitter strips 100 of the present invention may include the following characteristics:

Novel form factor for the transponding unit: extended antenna surface area with one or more ganged antennas, thin flexible packaging that is adhered to a roadway surface rather than designed to be buried;

Capable of being simultaneously excited by multiple sources (e.g., multiple passing vehicles transmitting energy pulses);

Novel powering mechanism that is designed for receiving high-power RF impulses with low-duty cycles feeding attached transient energy storage components (such as capacitor storage or other types of storage means) within the emitter strips 100 for quasi self-powering;

Novel multiple field transponding capability;

Novel emitter-fed "continuous emitting" shapeable guidance cable;

Novel "field" gang programming of emitter groups; and

Novel ability to "roll out" sequential attached emitters with different emission characteristics while sharing a common power bus.

Additionally, methods of use for the roadway guidance system in accordance with the present invention provides the following benefits and characteristics:

A novel design able to alter average excitation power within an emitter 102 via dynamic adjustment of pulse repetition rate;

A novel design able to alter average excitation power within an emitter 102 via dynamic adjustment of pulse repetition rate via "closed loop" path loss determination;

A novel design able to alter emitter output power via dynamic monitoring of the excitation pulse repetition rate;

A novel "tri-mode" guidance ability;

A novel data-source verification system;

A novel tri-antenna comparator circuit;

A novel differential received level comparator circuit;

A unique system for reducing nausea inducing motions by dynamically dampening the guidance correction parameters proportional to the forward vehicular speed; and A unique method for preventing wrong-way travel on a one-way roadway by comparing a "one way street" emitter's type against a series of incrementing or decrementing data field transmissions.

While the emitter strips and pulses described herein have been generally referred to as RF pulses, it is within the scope of the present disclosure for the signals transmitted by components described herein to be any kind of wireless signal. For instance, the wireless signals may be Bluetooth®, NFC, Wi-Fi®, cellular network, visible and invisible light spectrum electromagnet radiation, and the like. Similarly, other methods of emitter powering, such as inductive means, may also be used.

While the emitter strips 100 are shown herein as having a particular number of antennas 104, it should be readily understood that each emitter strip 100 can have any number of antennas 104. For example, an emitter strip 100 can have one, two, three, or fifty antennas 104. Similarly, while the active emitter 102 of the emitter strip 100 is shown as being centrally located between an equal number of antennas 104 in FIG. 1 (four antennas 104 on either side), it is within the scope of the present disclosure for active emitter 102 to be located in between any of the antennas 104 of an emitter strip 100 or disposed to one side relative to all the antennas 104.

The plurality of emitter strips 100, as illustrated, have spacing between each consecutive emitter strip 100 along their respective center line, edge line or median line. The spacing between each consecutive emitter strip 100 may be larger or smaller than as shown in the drawings. Or there may be effectively no spacing between consecutive emitter strips 100A, 100B such that the plurality of emitter strips 100A, 100B form a substantially continuous path of emitter strips 100A, 100B. The emitter 102 lengths and spacing between adjacent emitters 102 may be variably configured to address the particular application. For instance, on lower speed roadways the distance between emitters 102 can be shortened relative to distances between emitters 102 on higher speed roadways.

While the emitter strips 100 being referred to as instructing emitters have been shown and described in an embodiment where the emitters 102 are disposed along edge lines (FIG. 6), it is within the scope of the present disclosure for instructing emitters to be disposed along centerlines of roadways and/or disposed along temporary lines. On multiple lane roadways, the emitter strips 100 between travel lanes may indicate lane position of the roadway. For instance, the emitters 102 may designate lanes as Lane X "right" and Lane Y "left" or any other appropriate informational designator.

Advantageously, the principles disclosed in connection with the specific roadway guidance systems shown and described herein may be applied to many different roadway configurations, such as one-way roads, multiple lane highways, roadways with and without physical median barriers, parking lot roadways, highway roadways, driveway roadways, tunnel roadways, bridge roadways, roundabout roadways, and the like. Virtually any kind of roadway having one or more travel lanes can be constructed or retrofitted with roadway guidance systems and methods in accordance with principles of the present disclosure.

The foregoing description of embodiments of the present disclosure has been presented for the purpose of illustration and description. It is not intended to be exhaustive or to limit the invention to the form disclosed. Obvious modifications and variations are possible in light of the above disclosure and should be considered to be within the scope and spirit of the present disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A roadway guidance system comprising:
a plurality of emitter strips disposed along a roadway in spaced intervals in a direction of travel, each said emitter strip comprising an emitter and a plurality of strip antennas configured to transmit a wireless signal, the emitter being in communication with each strip antenna of the plurality of strip antennas through a common feedline,
wherein said signal for each emitter strip includes (i) location data identifying the placement location of said emitter strip on the roadway; and (ii) informative data providing information relating to the portion of the roadway where said emitter strip is located,
wherein each emitter strip of the plurality of emitter strips has a length less than 10 feet,
wherein the emitter of each emitter strip is adapted to be excited by energy pulses transmitted from a passing vehicle, and
wherein each of the plurality of strip antennas is configured to receive the energy pulses, generate excitation energy from energy of the energy pulses, and transmit the excitation energy to the emitter.

2. The roadway guidance system according to claim 1, wherein the location data transmitted by each emitter strip correlates to whether each said emitter strip is positioned proximate to a left edge of a travel lane on the roadway, proximate to a right edge of said travel lane, or in a centerline of said travel lane.

3. The roadway guidance system according to claim 1, wherein the informative data transmitted by each emitter strip correlates to whether a portion of the upcoming travel lane proximate to the emitter strip is straight, curves left, curves right, inclines or declines.

4. The roadway guidance system according to claim 1, wherein the signal transmitted by at least one of the emitter strips in the plurality of emitter strips further includes alert data.

5. The roadway guidance system according to claim 4, wherein said alert data correlates to at least one of traffic data for an upcoming roadway relative to the at least one emitter strip, the drivable condition of the upcoming roadway, and travel lane closure for the upcoming roadway.

6. The roadway guidance system according to claim 1, further comprising a receiver apparatus associated with the passing vehicle travelling on the roadway, wherein said receiver apparatus includes at least one vehicle antenna configured to detect the wireless signals transmitted by at least a subset of emitter strips of the plurality of emitter strips as said vehicle antenna passes said subset of emitter strips.

7. The roadway guidance system according to claim 6, wherein the receiver apparatus comprises three vehicle antennas spaced relative to one another and laterally disposed on the passing vehicle relative to the direction of travel of the roadway.

8. The roadway guidance system according to claim 7, wherein the three vehicle antennas comprise:
a first vehicle antenna positioned on the left side of the passing vehicle;
a second vehicle antenna positioned on the right side of the passing vehicle; and
a third vehicle antenna positioned in the center of the passing vehicle.

9. The roadway guidance system according to claim 8, wherein:
the first vehicle antenna is configured to detect wireless signals transmitted by emitter strips positioned proximate to the left side of the travel lane;
the second vehicle antenna is configured to detect wireless signals transmitted by emitter strips positioned proximate to the right side of the travel lane; and
the third vehicle antenna is configured to detect wireless signals transmitted by emitter strips located along the centerline of the travel lane.

10. The roadway guidance system according to claim 8, further comprising:
a fourth vehicle antenna positioned adjacent to the third vehicle antenna between said third vehicle antenna and one of the first and second vehicle antennas; and
a fifth vehicle antenna positioned adjacent to the third vehicle antenna between said third vehicle antenna and the other of the first and second vehicle antennas.

11. The roadway guidance system according to claim 10, wherein:
the first vehicle antenna is configured to detect wireless signals transmitted by emitter strips positioned proximate to the left side of the travel lane;
the second vehicle antenna is configured to detect wireless signals transmitted by emitter strips positioned proximate to the right side of the travel lane; and
the third, fourth and fifth vehicle antennas are configured to detect wireless signals transmitted by emitter strips located along the centerline of the travel lane.

12. The roadway guidance system according to claim 6, wherein the receiver apparatus is in operative communication with operative components of the passing vehicle for adjusting operation of the passing vehicle based on analysis of the wireless signal strengths received from emitter strips in the roadway.

13. The roadway guidance system according to claim 12, wherein the wireless signal received by the receiver apparatus is used to maintain the position of the passing vehicle during travel along the roadway relative to one or more of the left edge, the right edge and the centerline of the travel lane in which the passing vehicle is travelling.

14. The roadway guidance system according to claim 12, wherein the informative data and the relative differential signal strength of the wireless signals received by the receiver apparatus is used to operate the passing vehicle during travel along the roadway.

15. The roadway guidance system according to claim 1, wherein each emitter strip contains transient energy storage components for capture and use of excitation power.

16. The roadway guidance system according to claim 1, wherein the plurality of strip antennas comprises eight strip antennas.

17. The roadway guidance system according to claim 1, wherein the emitter is centrally arranged between an equal number of strip antennas of the plurality of antennas.

18. The roadway guidance system according to claim 1, wherein the emitter is disposed to one side of the plurality of strip antennas.

19. The roadway guidance system according to claim 1, wherein the emitter is configured to transmit data to the plurality of antennas after receiving the excitation energy.

20. The roadway guidance system according to claim 1, wherein each emitter strip comprises a capacitor configured to store energy pulses wirelessly received by the emitter strip.

21. A roadway guidance system comprising:
a plurality of emitter strips disposed along a roadway in spaced intervals in a direction of travel, each said emitter strip comprising an emitter and a plurality of strip antennas configured to transmit a wireless signal, the emitter being in communication with each strip antenna of the plurality of strip antennas through a common feedline;
a receiver apparatus associated with a passing vehicle travelling on the roadway, wherein said receiver apparatus includes at least three vehicle antennas spaced relative to one another and laterally disposed on the passing vehicle relative to the direction of travel of the roadway, each of said vehicle antennas being configured to detect the wireless signals transmitted by at least a respective subset of emitter strips of the plurality of emitter strips as said vehicle antenna passes said subset of emitter strips; and
a controller for interpreting the relative signal strengths detected by the vehicle antennas for maintaining the position of the passing vehicle within a travel lane as the passing vehicle is moving along the roadway based on signal information transmitted by the emitter strips of the plurality of emitter strips to determine the position of the passing vehicle relative to one or more of the left edge, the right edge and the centerline of the travel lane;

wherein each emitter strip of the plurality of emitter strips has a length less than 10 feet,
wherein the emitter of each emitter strip is adapted to be excited by energy pulses transmitted from the passing vehicle, and
wherein each of the plurality of strip antennas is configured to receive the energy pulses, generate excitation energy from energy of the energy pulses, and transmit the excitation energy to the emitter.

22. The roadway guidance system according to claim 21, wherein the controller interprets transmitted signal strengths of the wireless signals and data received by the receiver apparatus for operation of the passing vehicle and adjustment of one of speed and direction of the passing vehicle on the roadway relative to one or more of the left edge, the right edge and the centerline of the travel lane.

23. The roadway guidance system according to claim 21, wherein said signal for each emitter strip includes (i) location data identifying the location of said emitter strip on the roadway; and (ii) informative data providing information relating to the portion of the roadway where said emitter strip is located.

24. The roadway guidance system according to claim 23, wherein the location data transmitted by each emitter strip correlates to whether each said emitter strip is positioned proximate to a left edge of a travel lane on the roadway, proximate to a right edge of said travel lane, or in a centerline of said travel lane.

25. The roadway guidance system according to claim 23, wherein the informative data transmitted by each emitter strip correlates to whether a portion of the upcoming travel lane proximate to the emitter strip is straight, curves left, curves right, inclines or declines.

26. The roadway guidance system according to claim 23, wherein the wireless signal is a radio frequency (RF) signal, and wherein the relative RF signal strength and location data received by the receiver apparatus is used to maintain the position of the passing vehicle during travel along the roadway relative to one or more of the left edge, the right edge and the centerline of the travel lane in which the passing vehicle is travelling.

27. The roadway guidance system according to claim 23, wherein the wireless signal is a radio frequency (RF) signal, and wherein the relative RF signal strength and informative data received by the receiver apparatus is used to operate the passing vehicle during travel along the roadway.

28. The roadway guidance system according to claim 23, wherein the wireless signal is a radio frequency (RF) signal, and wherein the RF signal transmitted by at least one of the emitter strips in the plurality of emitter strips further includes alert data.

29. The roadway guidance system according to claim 28, wherein said alert data correlates to at least one of traffic data for an upcoming roadway relative to the at least one emitter strip, the drivable condition of the upcoming roadway, and travel lane closure for the upcoming roadway.

30. The roadway guidance system according to claim 21, wherein the three vehicle antennas comprise:
a first vehicle antenna positioned on the left side of the passing vehicle;
a second vehicle antenna positioned on the right side of the passing vehicle; and
a third vehicle antenna positioned in the center of the passing vehicle.

31. The roadway guidance system according to claim 30, wherein:
the first vehicle antenna is configured to detect wireless signals transmitted by emitter strips positioned proximate to the left side of the travel lane;
the second vehicle antenna is configured to detect wireless signals transmitted by emitter strips positioned proximate to the right side of the travel lane; and
the third vehicle antenna is configured to detect wireless signals transmitted by emitter strips located along the centerline of the travel lane.

32. The roadway guidance system according to claim 31, further comprising:
a fourth vehicle antenna positioned adjacent to the third antenna between said third antenna and one of the first and second antennas; and
a fifth vehicle antenna positioned adjacent to the third antenna between said third antenna and the other of the first and second antennas.

33. The roadway guidance system according to claim 32, wherein:
the first vehicle antenna is configured to detect wireless signals transmitted by emitter strips positioned proximate to the left side of the travel lane;
the second vehicle antenna is configured to detect wireless signals transmitted by emitter strips positioned proximate to the right side of the travel lane; and
the third, fourth and fifth vehicle antennas are configured to detect wireless signals transmitted by emitter strips located along the centerline of the travel lane.

34. The roadway guidance system according to claim 21, wherein each emitter strip contains transient energy storage components for capture and use of excitation power.

35. A method of using a roadway guidance system comprising the steps of:
transmitting energy pulses from a vehicle to an emitter strip located on a roadway, the emitter strip having a length of less than 10 feet and including an emitter and a plurality of strip antennas, the emitter being in communication with each strip antenna of the plurality of strip antennas through a common feedline;
receiving, by each of the plurality of strip antennas, the energy pulses;
generating, by each of the plurality of strip antennas, excitation energy from energy of the energy pulses;
transmitting, by each of the plurality of strip antennas, the excitation energy to the emitter;
detecting, after the transmitting said energy pulses, whether return signals are received by a receiver apparatus associated with the vehicle;
comparing, by the receiver apparatus, the received return signals in order to determine relative signal strengths of the received return signals;
determining an estimated position on the roadway based on the determined relative signal strengths;
comparing the estimated position on the roadway with a predefined position on the roadway; and
sending at least one of steering correction and braking correction to a vehicle computer to adjust the position of the vehicle.

* * * * *